(12) United States Patent
Sato

(10) Patent No.: US 11,268,643 B2
(45) Date of Patent: Mar. 8, 2022

(54) PIPING STRUCTURE AND PROCESS AND PIPE CONSTRUCTION METHOD

(71) Applicant: SUIKEN Co., Ltd., Shiga (JP)

(72) Inventor: Toshiyuki Sato, Shiga (JP)

(73) Assignee: SUIKEN Co., Ltd., Shiga (JP)

( * ) Notice: Subject to any disclaimer, the term of this patent is extended or adjusted under 35 U.S.C. 154(b) by 0 days.

(21) Appl. No.: 16/970,200

(22) PCT Filed: Feb. 14, 2019

(86) PCT No.: PCT/JP2019/005324
§ 371 (c)(1),
(2) Date: Aug. 14, 2020

(87) PCT Pub. No.: WO2019/167646
PCT Pub. Date: Sep. 6, 2019

(65) Prior Publication Data
US 2020/0408346 A1    Dec. 31, 2020

(30) Foreign Application Priority Data

Mar. 2, 2018  (JP) .............................. JP2018-037422
May 30, 2018  (JP) .............................. JP2018-103553
Oct. 17, 2018  (JP) .............................. JP2018-195620

(51) Int. Cl.
*F16L 41/06*   (2006.01)
*F16L 55/105*  (2006.01)

(52) U.S. Cl.
CPC ............. *F16L 41/06* (2013.01); *F16L 55/105* (2013.01)

(58) Field of Classification Search
CPC .................................. F16L 55/105; F16L 41/06
See application file for complete search history.

(56) References Cited

U.S. PATENT DOCUMENTS 3,170,226 A * 2/1965 Larry .................... F16K 3/0254
                                                        29/890.11
5,660,199 A * 8/1997 Maichel .................. F16L 41/06
                                                         137/15.12

(Continued)

FOREIGN PATENT DOCUMENTS

DE        2159518 A     6/1973
JP     2000-179779 A    6/2000

(Continued)

OTHER PUBLICATIONS

International Search Report Issued in PCT/JP2019/005324 dated May 7, 2019 (w/ Engl. Translation).

*Primary Examiner* — Kevin R Barss
(74) *Attorney, Agent, or Firm* — Renner, Otto, Boisselle & Sklar, LLP

(57) ABSTRACT

A piping structure and a process, with which it is possible to form an opening in a pipe while preventing shavings produced from cutting from entering the pipe. A process for forming an opening in a pipe, including: a step of enclosing the pipe with a case divided in a circumferential direction R of the pipe; a skin formation step of cutting an outer surface of the pipe with a cutting tool arranged in the case, thereby forming a bottomed groove, which is formed as a skin, on the pipe; a suction step of sucking shavings produced from cutting, together with a gas in the case in order to remove the shavings; and breaking the skin to form the opening after performing the skin formation step and the suction step.

14 Claims, 27 Drawing Sheets

(56) References Cited

U.S. PATENT DOCUMENTS

| | | | |
|---|---|---|---|
| 6,283,446 B1 | 9/2001 | Sato et al. | |
| 2001/0010233 A1* | 8/2001 | Sato | F16L 55/105 |
| | | | 137/318 |
| 2004/0222399 A1* | 11/2004 | Maichel | F16L 41/06 |
| | | | 251/326 |
| 2012/0222753 A1 | 9/2012 | Sato et al. | |
| 2016/0230897 A1* | 8/2016 | Munetomo | F16K 3/0272 |
| 2020/0386346 A1* | 12/2020 | Horikawa | F16L 55/105 |
| 2021/0254761 A1* | 8/2021 | Sato | F16L 55/105 |

FOREIGN PATENT DOCUMENTS

| | | |
|---|---|---|
| JP | 2000-266273 A | 9/2000 |
| JP | 2001-146983 A | 5/2001 |
| JP | 2004-069059 A | 3/2004 |
| JP | 2009-168199 A | 7/2009 |
| JP | 2016-075312 A | 5/2016 |
| WO | WO 2011-099398 A1 | 8/2011 |

* cited by examiner

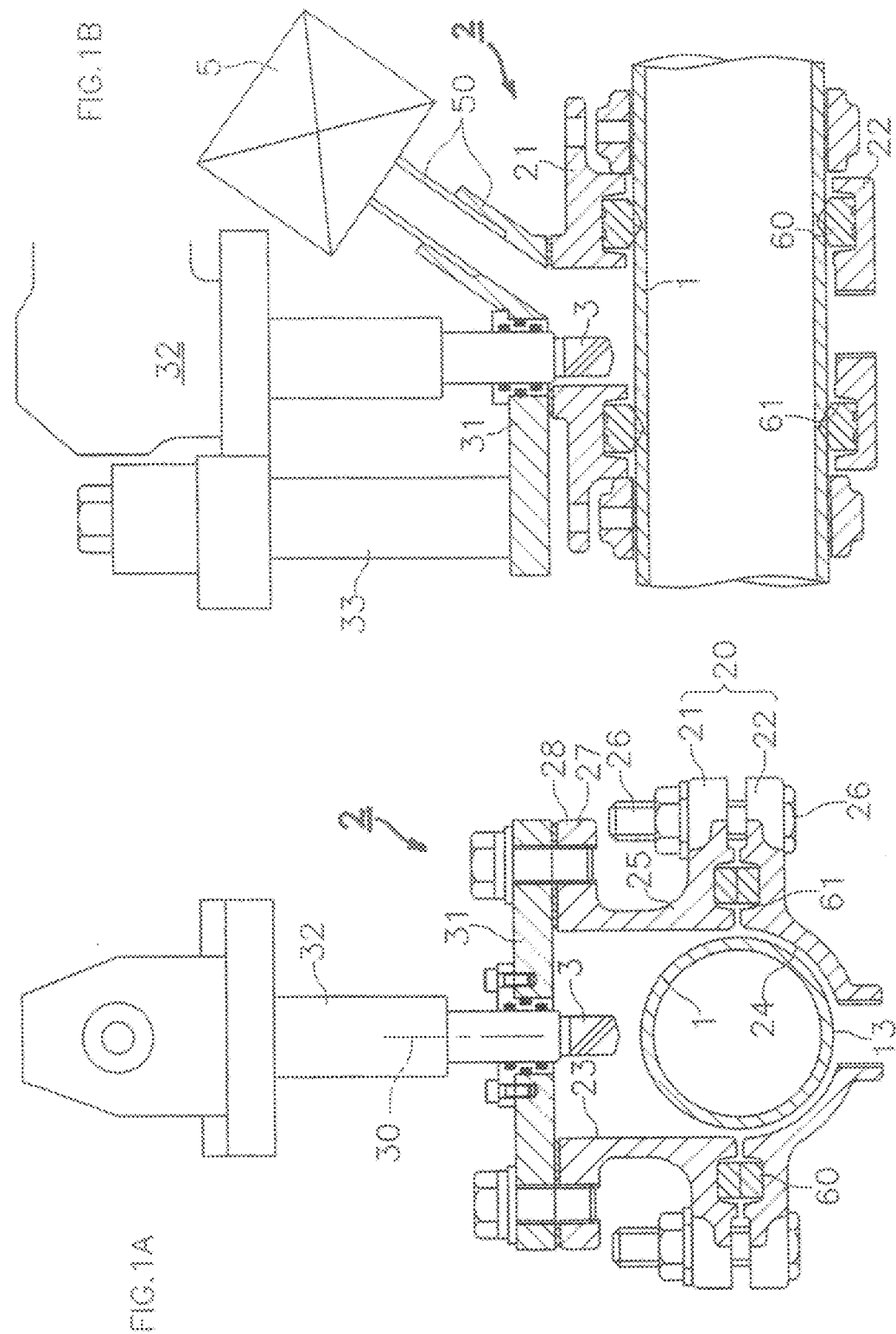

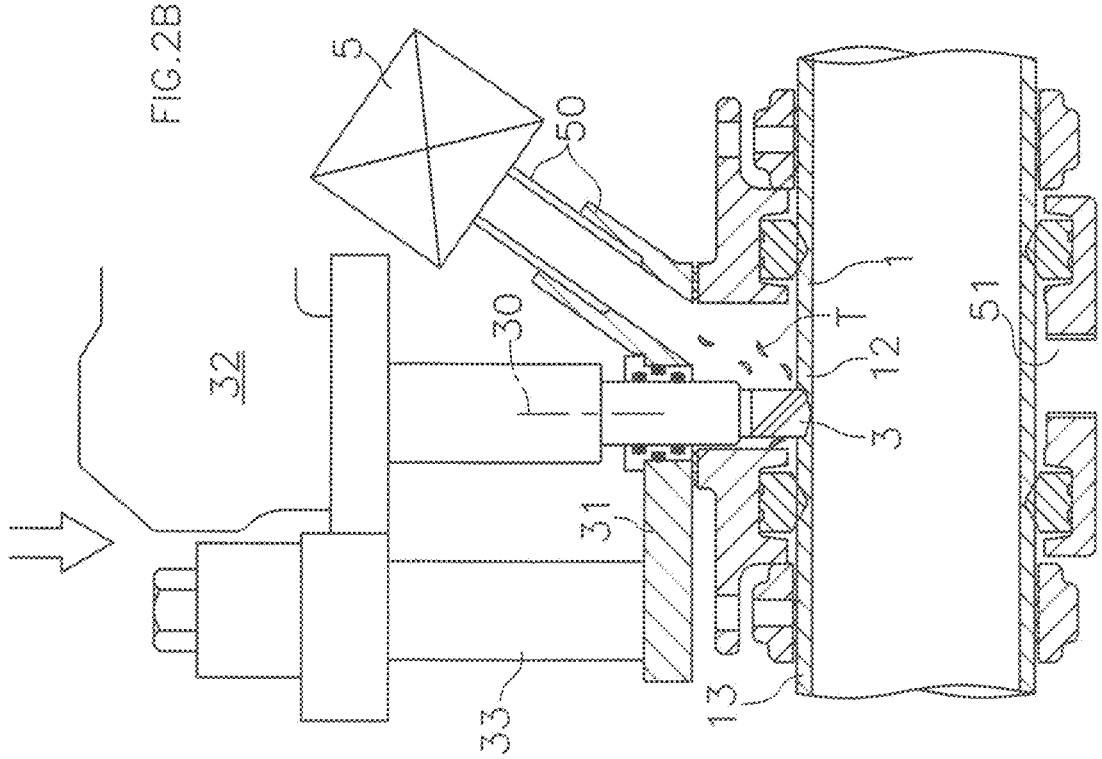
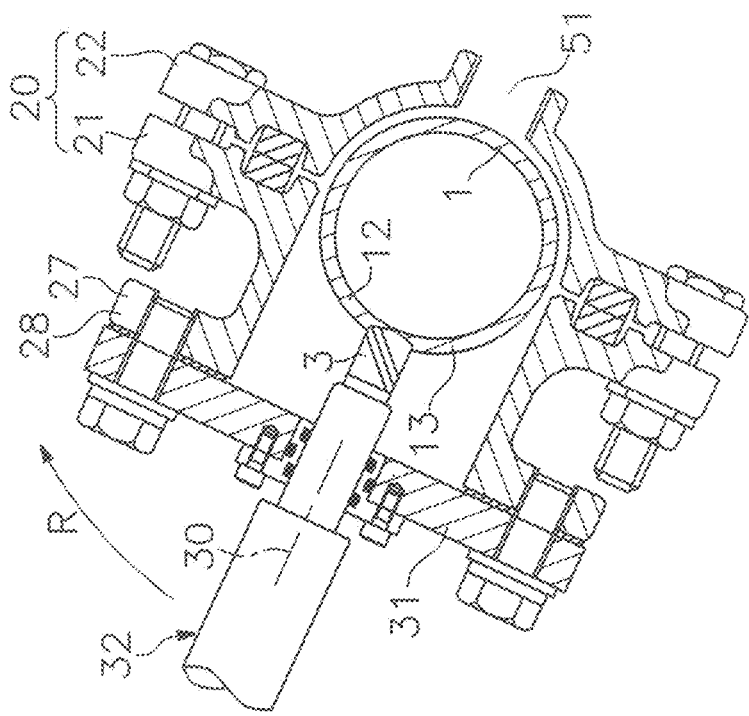

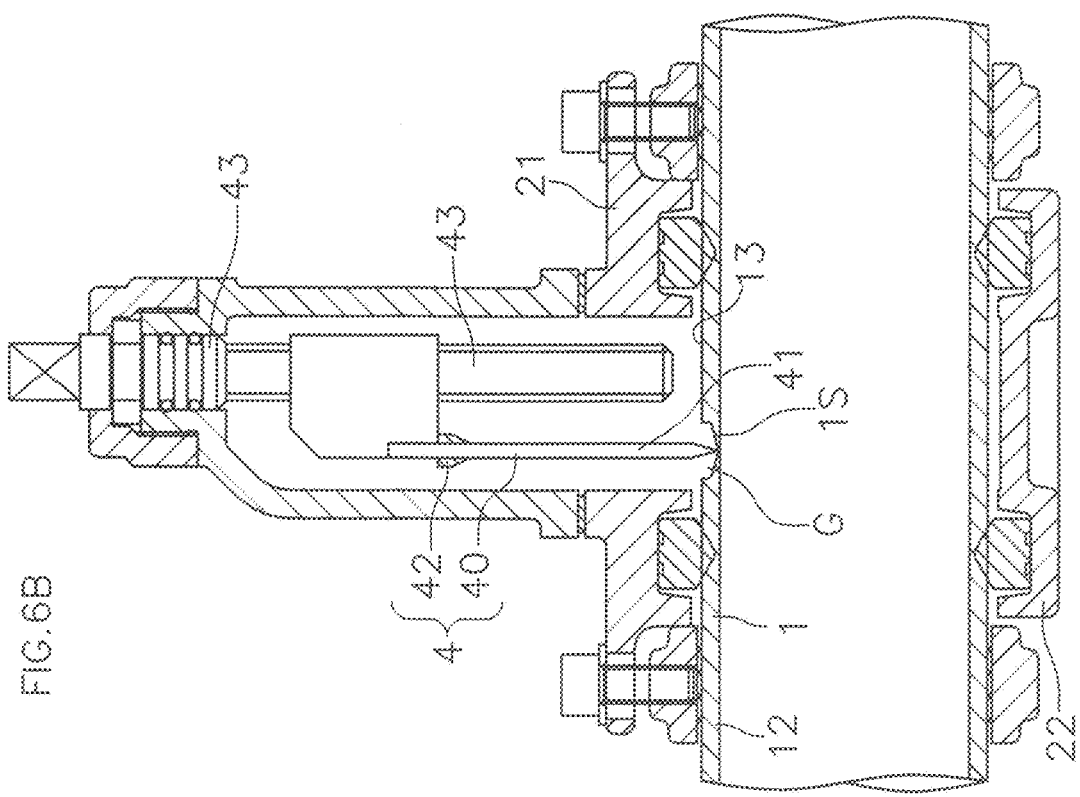
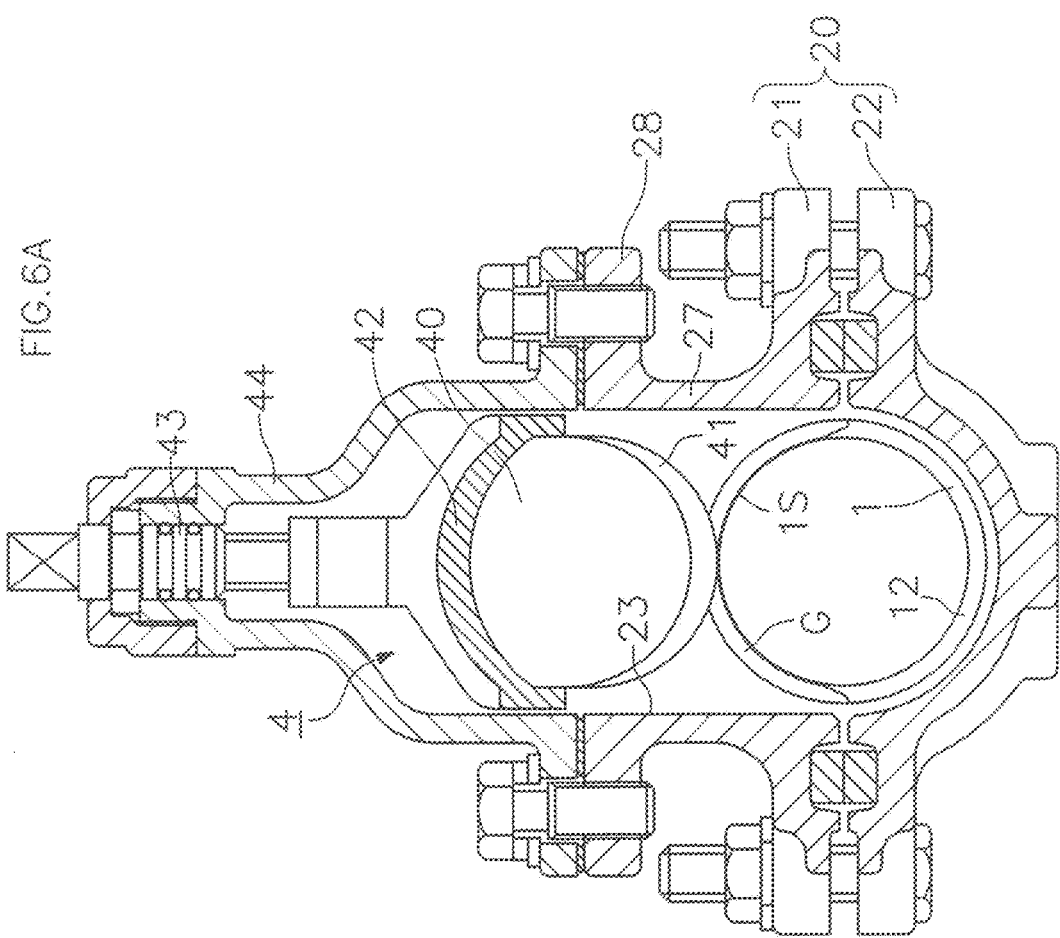

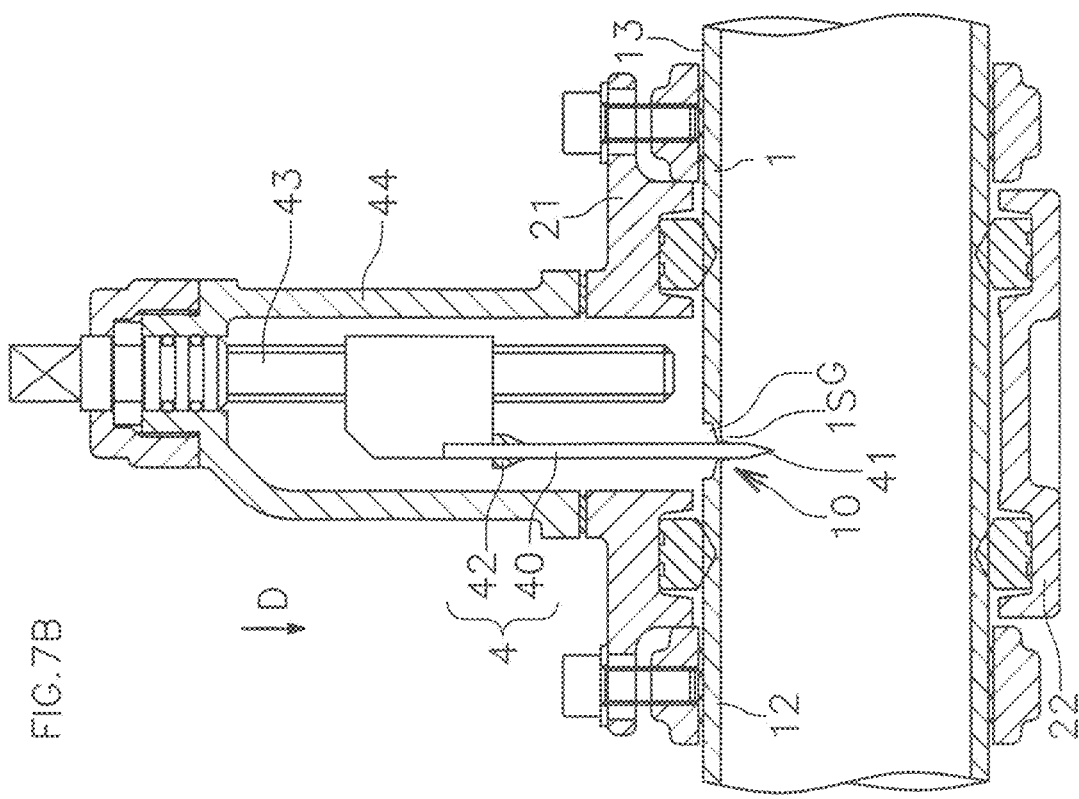
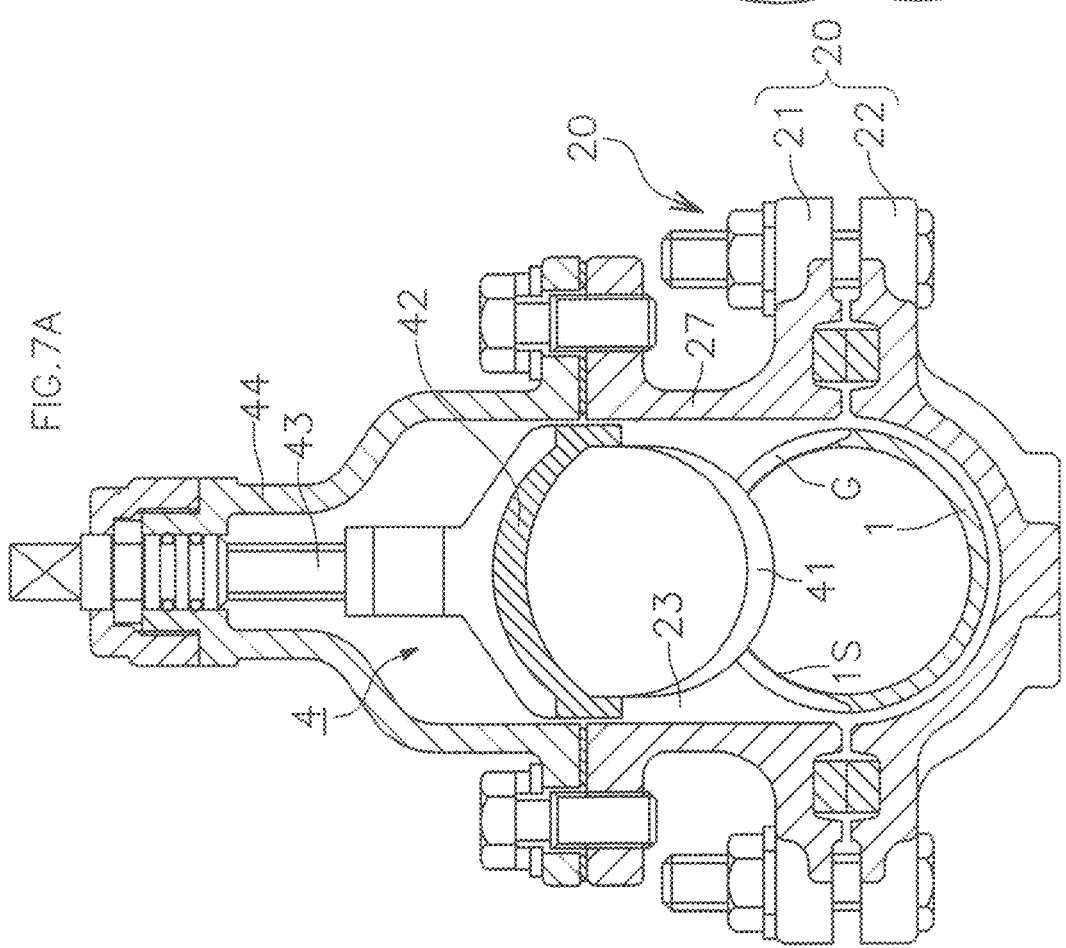

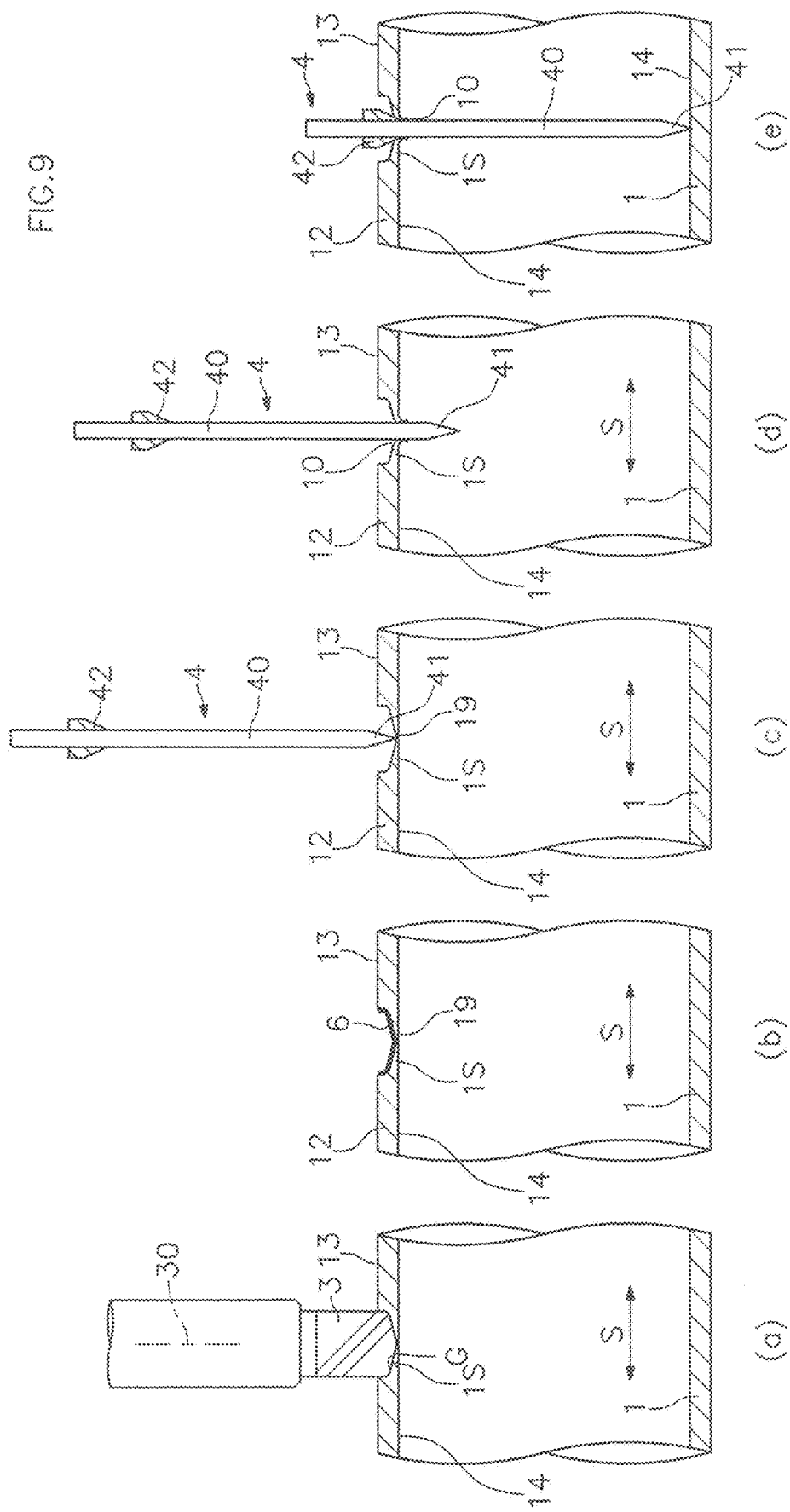

FIG. 11
(a)
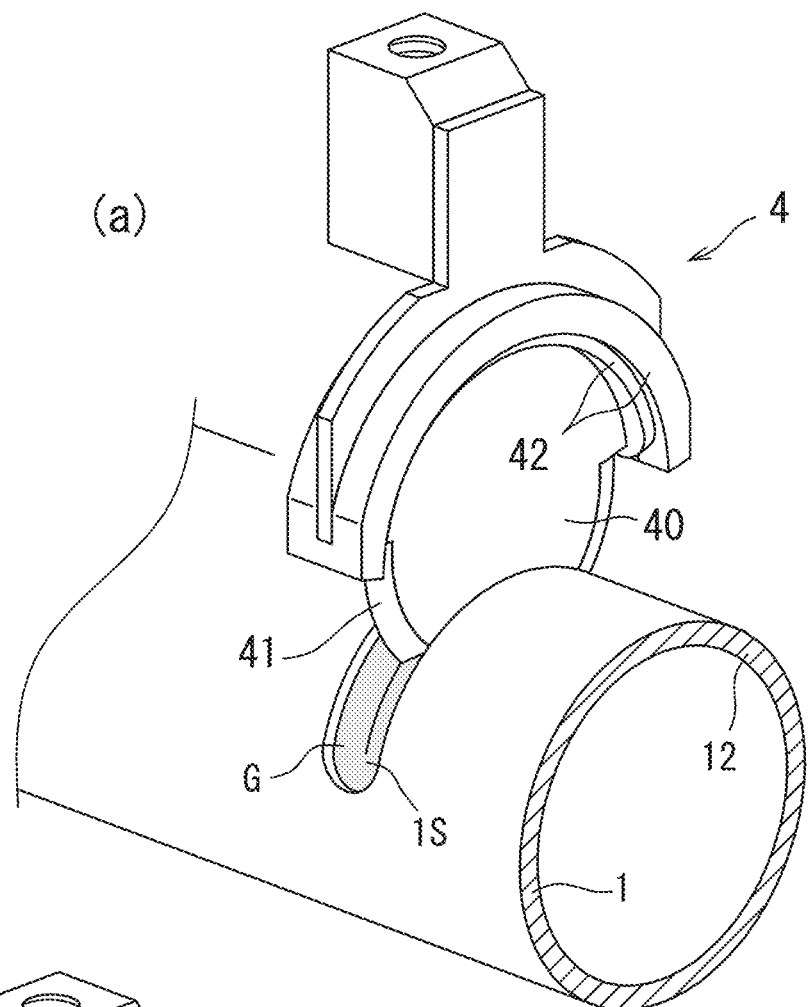
(b)
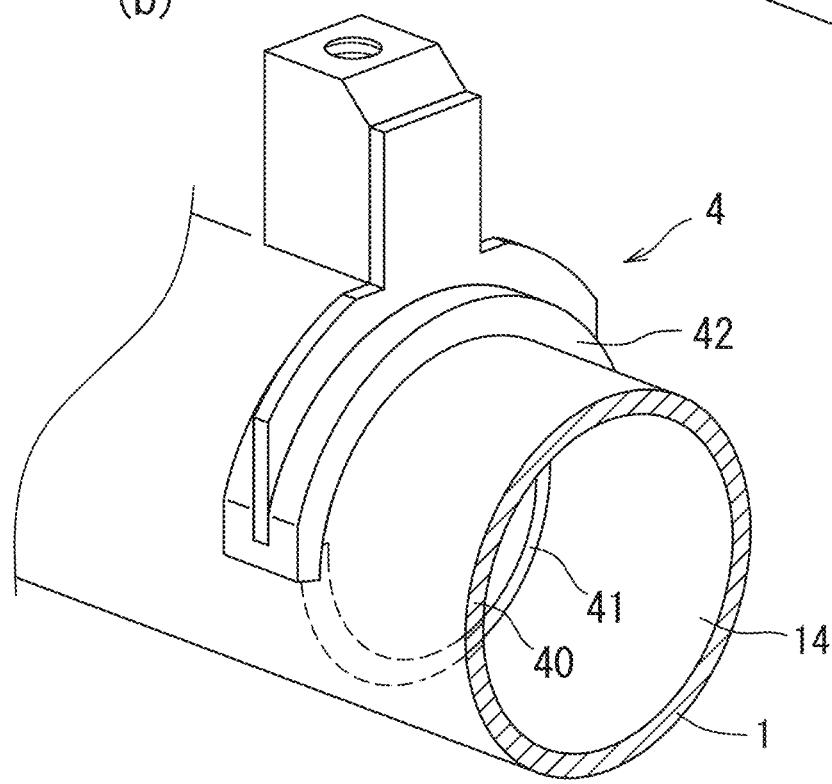

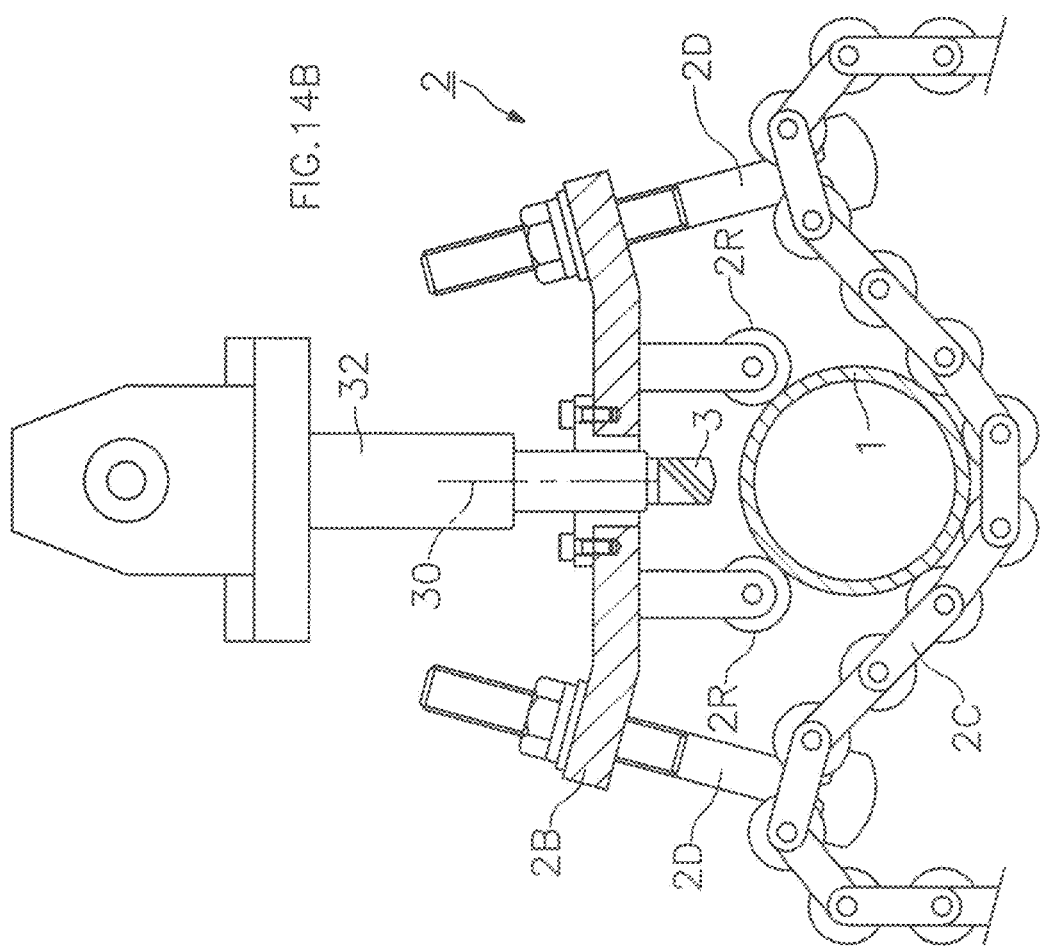
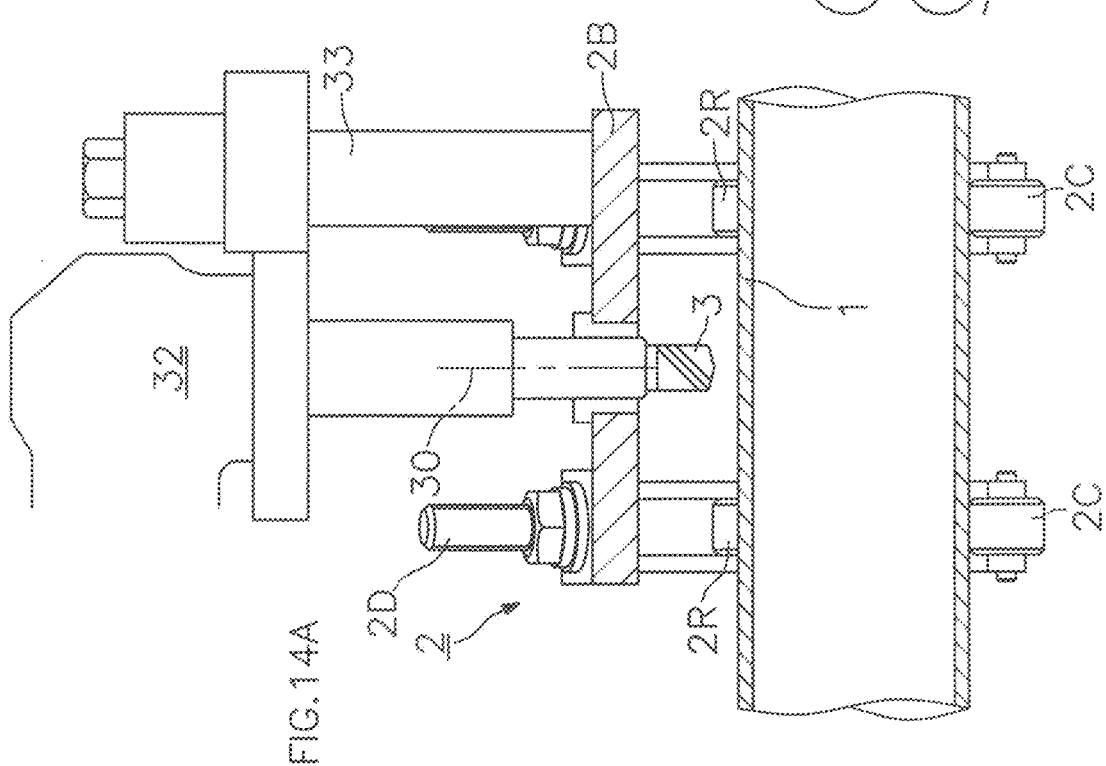

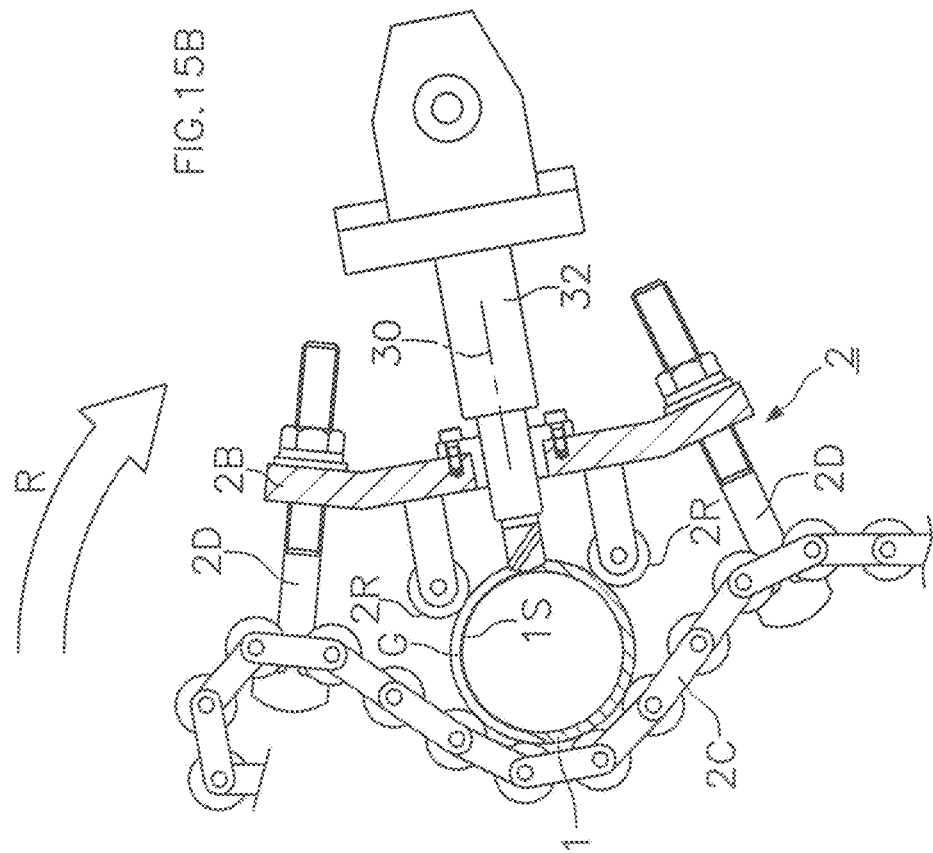
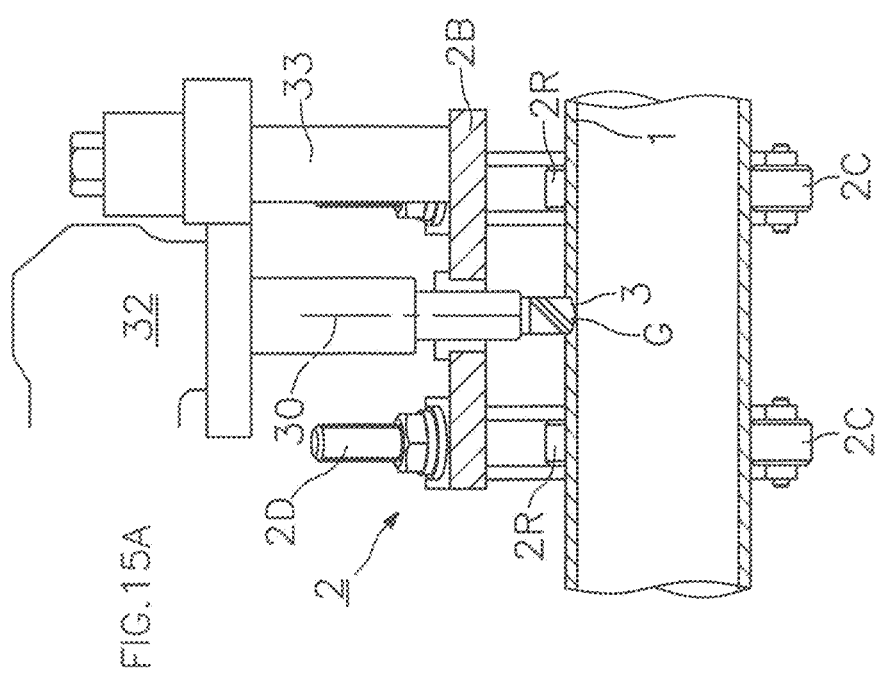

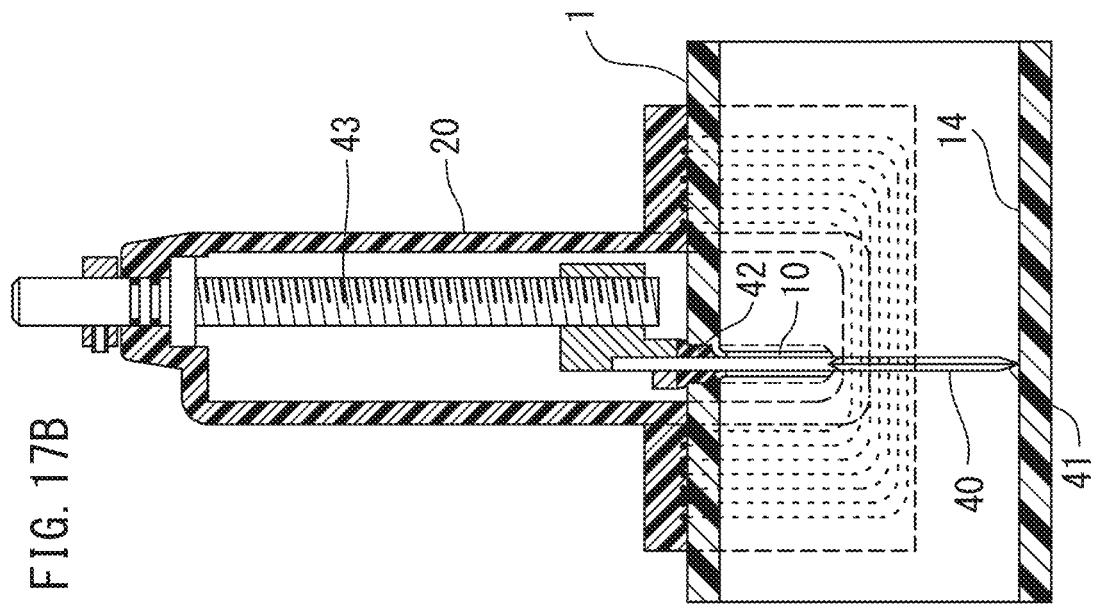
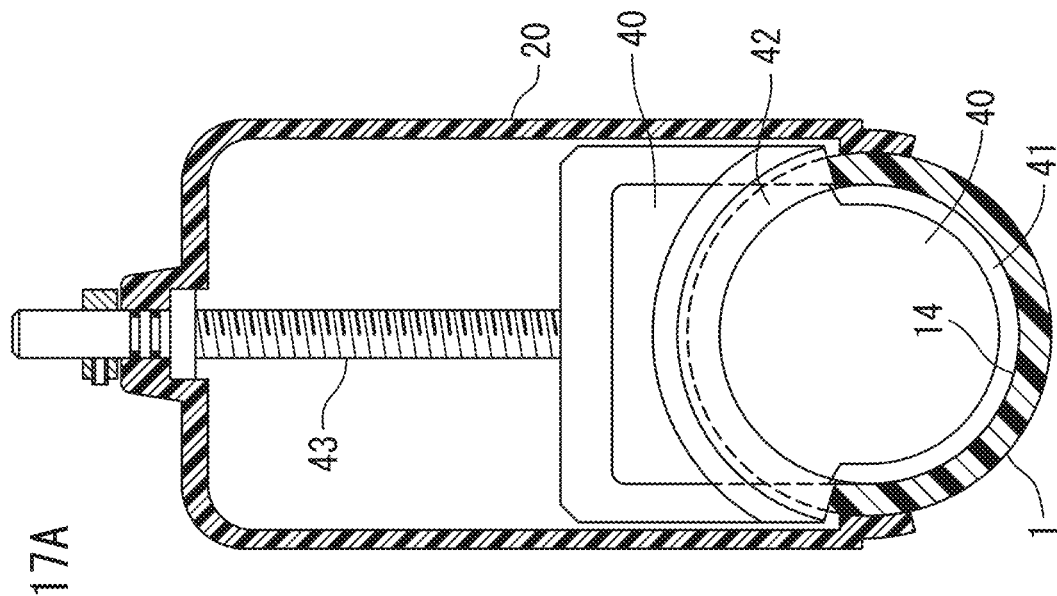

FIG. 21
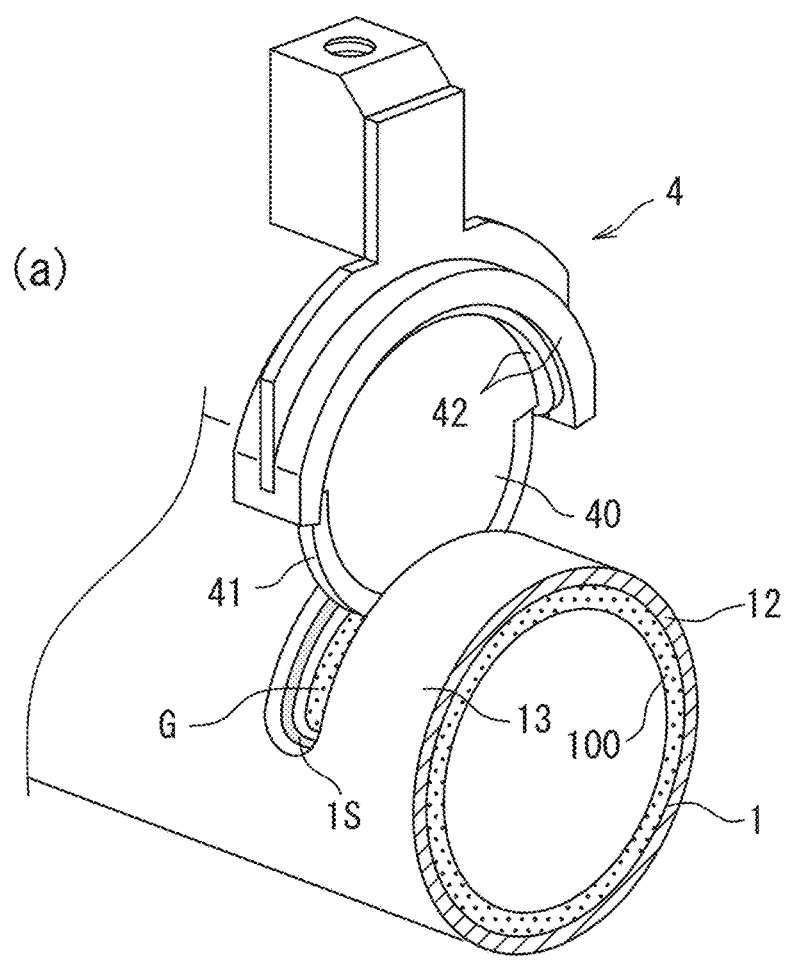
(a)
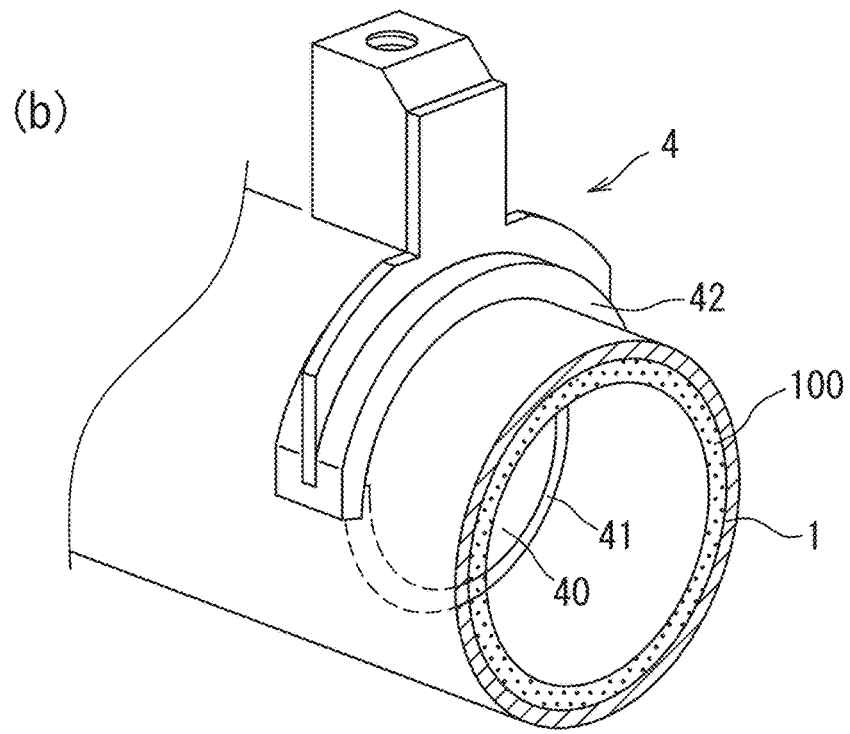
(b)

FIG. 24
(a) 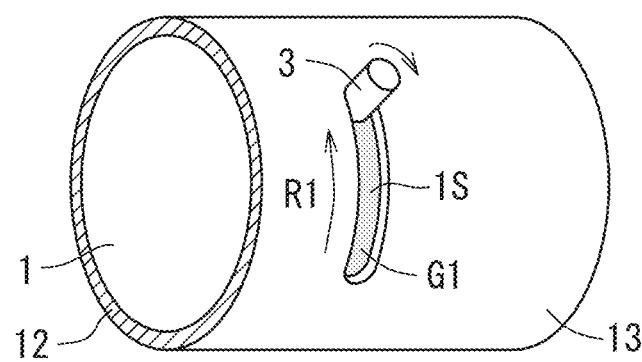
(b) 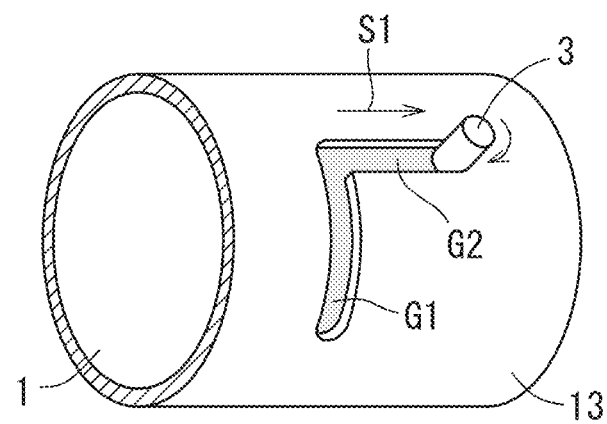
(c) 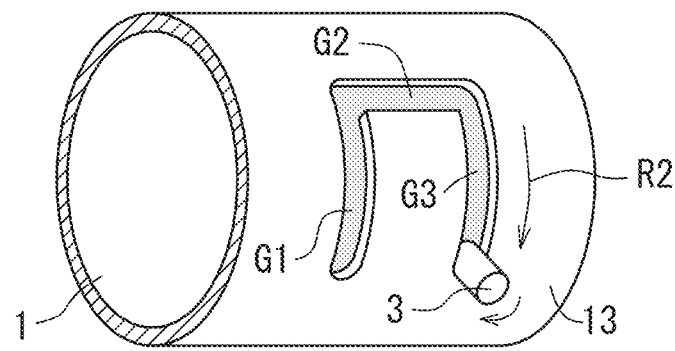
(d) 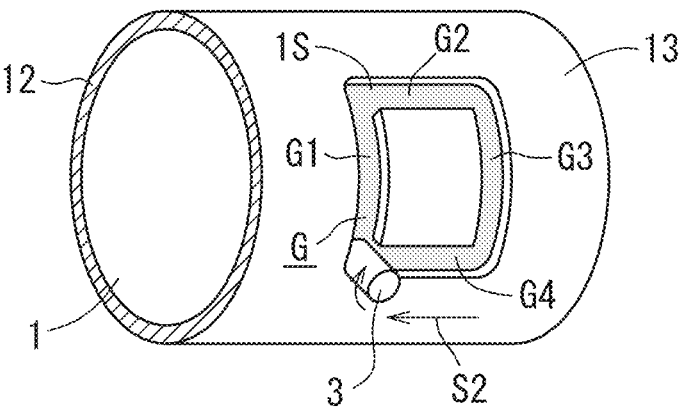

PIPING STRUCTURE AND PROCESS AND PIPE CONSTRUCTION METHOD

TECHNICAL FIELD

The present invention relates to a piping structure, a process and a pipe construction method.

BACKGROUND ART

There are conventional processes well known in the art, in which an existing pipe is cut by a cutting tool to form an opening without disrupting the flow of a fluid through the existing pipe, and a gate valve body is inserted into the line of the existing pipe through the opening (see first and second patent documents).

CITATION LIST

Patent Document

[FIRST PATENT DOCUMENT] JP2000-179779 A (Abstract)
[SECOND PATENT DOCUMENT] JP2004-69059 A (Abstract)
[THIRD PATENT DOCUMENT] WO2011/099398 A (Front page)

Cutting the pipe wall of an existing pipe with a cutting tool such as an endmill or a hole saw produces shavings. For this, a drain is provided in a case, and the shavings are drained together with the fluid in the existing pipe.

SUMMARY OF INVENTION

With conventional processes, however, it is not possible to prevent fine shavings produced when forming an opening with a cutting tool from entering the existing pipe. Such shavings become a foreign matter inside the water pipe, and also lead to formation of rust.

Thus, it is an object of the present invention to provide a piping structure, a process and a pipe construction method (process), with which it is possible to form an opening in a pipe while preventing shavings produced from cutting from entering the pipe.

In a first aspect, a method of the present invention is a process for forming an opening in a pipe 1, including:
a step of enclosing a portion of the pipe 1 with a case 20, wherein a cutter 32 having a milling-shaped tool as a cutting tool 3 is attached to the case 20;
a skin formation step of cutting an outer surface 13 of the pipe 1 with the cutting tool 3 arranged in the case 20, thereby forming a groove G on the pipe 1, the groove G having a bottom that is formed as a skin (a thin skin) 1S;
a removal step of removing shavings T produced from the cutting; and
a step of thrusting through the skin 1S to form the opening 10, after performing the skin formation step and the removal step.

In a second aspect, a method of the present invention is a process for forming an opening in a pipe 1, including:
a step of attaching a rotating unit 2 around the pipe 1, the rotating unit 2 being rotatable in a circumferential direction R of the pipe 1, wherein a cutter 32 having a milling-shaped cutting tool 3 is attached to the rotating unit;
a skin formation step of revolving the cutting tool 3 in the circumferential direction R of the pipe 1 together with the rotating unit 2 while rotating the milling-shaped cutting tool 3 about a central axis 30 of the tool, thereby cutting an outer surface 13 of the pipe 1 to form a groove G on the pipe 1, the groove G being elongated in the circumferential direction R and having a bottom that is formed as a skin (a thin skin) 1S;
a removal step of removing shavings T produced from the cutting; and
a step of thrusting through the skin 1S to form the opening 10, after performing the skin formation step and the removal step.

With the method of the present invention, the bottomed groove G is formed, instead of forming an opening in the pipe 1 with the cutting tool 3. Therefore, shavings T produced when cutting the pipe 1 with the cutting tool 3 will not enter the pipe 1.

On the other hand, the bottom of the groove G is formed as the thin skin 1S. Therefore, by thrusting through the skin 1S, it is possible to form the opening 10 without producing the shavings T.

On the other hand, a piping structure of the present invention is a piping structure including a gate valve body 4 assembled into a pipe 1, including:
a pipe 1 that defines a groove G extending in a circumferential direction R, the groove G having a bottom that is formed as a skin 1S;
a case 20 that encloses a portion of the pipe 1 including the groove G having the bottom;
a gate valve body 4 that is arranged in the case 20; and
a valve rod 43 that brings the gate valve body 4 closer toward the groove G and further moves the gate valve body 4 so as to thrust through the skin 1S of the bottom of the groove G to form an opening 10,
wherein the gate valve body 4 includes:
a circular-shaped valve main body 40 that enters an inside of the pipe 1;
a blade 41 that is provided on a distal end side of the valve main body 40 for breaking the skin 1S to form the opening 10; and
a seal portion 42 that is provided on a proximal end side, which is opposite to the distal end side, and contacts a portion of the pipe 1 around the opening 10 to shut the opening 10.

With the structure of the present invention, the blade 41, having thrusted through the skin 1S, contacts the inner periphery surface of the pipe 1, and the seal portion 42 contacts a portion of the pipe 1 around the groove G, thereby sealing between the upstream side and the downstream side in the pipe 1.

When the pipe 1 is made of a plastomer or an elastomer, the seal portion may be made of metal. On the other hand, when the existing pipe 1 is a steel pipe, or the like, the seal portion may be formed of an elastomer. A thermoplastic resin, latex, or the like, as well as vulcanized rubber, may be employed as the elastomer.

BRIEF DESCRIPTION OF THE DRAWINGS

FIG. 1A and FIG. 1B are a transverse sectional view and a longitudinal sectional view, respectively, showing an enclosing step of a flow-undisrupted process according to Embodiment 1.

FIG. 2A and FIG. 2B are a transverse sectional view and a longitudinal sectional view, respectively, showing a skin formation step of the flow-undisrupted process according to Embodiment 1.

FIG. 6A and FIG. 6B are a transverse sectional view and a longitudinal sectional view, respectively, showing a step of forming an opening of the flow-undisrupted process according to Embodiment 1.

FIG. 7A and FIG. 7B are a transverse sectional view and a longitudinal sectional view, respectively, showing the step of forming an opening of the flow-undisrupted process according to Embodiment 1.

FIG. 9 is a longitudinal sectional view showing, on an enlarged scale, a cutting tool and a gate valve body according to Embodiment 1, together with an existing pipe.

FIG. 11 is a schematic perspective view showing the step of the flow-undisrupted process according to Embodiment 1.

Figure 10:
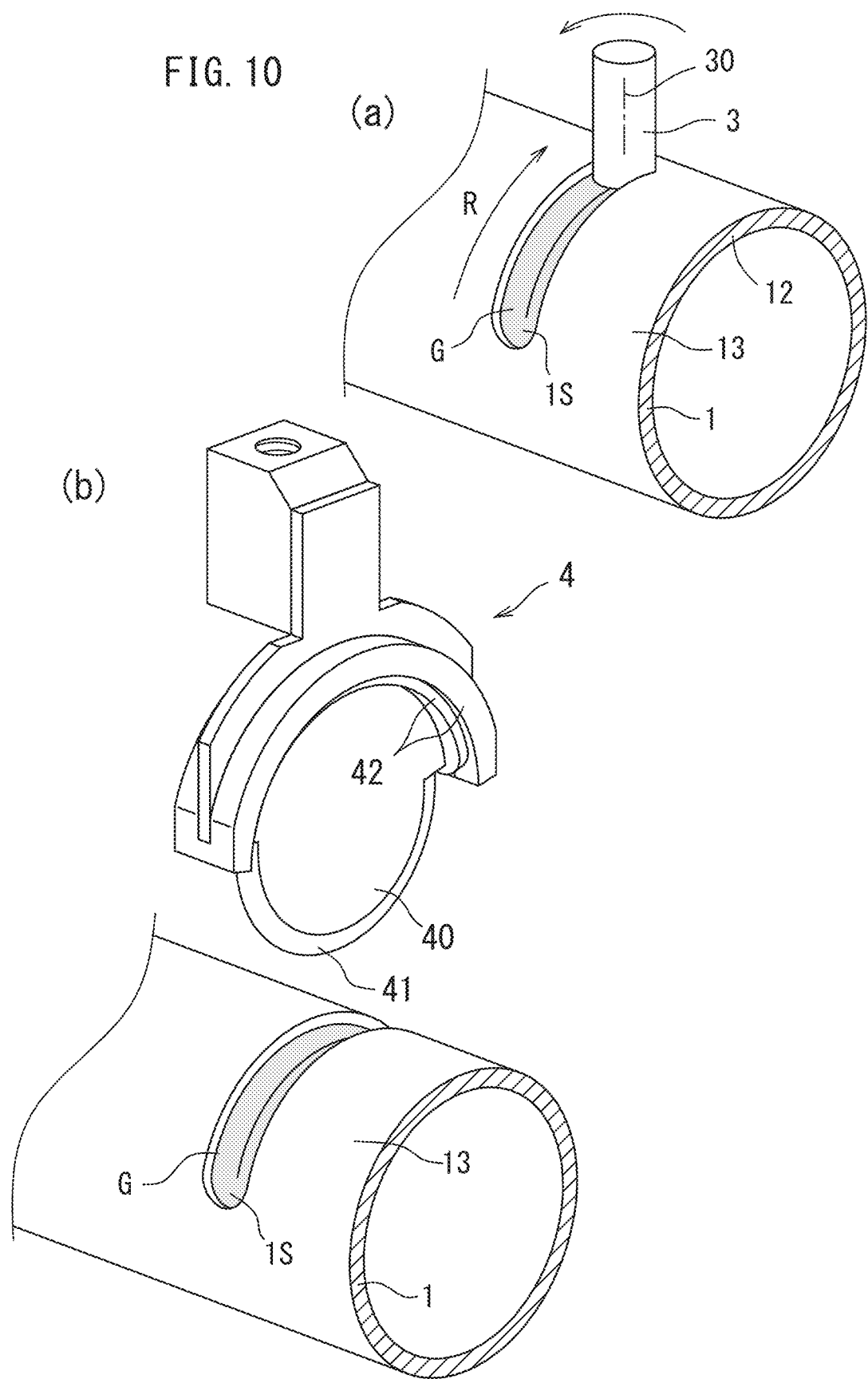
FIG. 10 is a schematic perspective view showing a step of the flow-undisrupted process according to Embodiment 1.

Note that a skin portion is shown in gray in FIG. 10 and FIG. 11 in order to make the structure clear.

Figure 12:
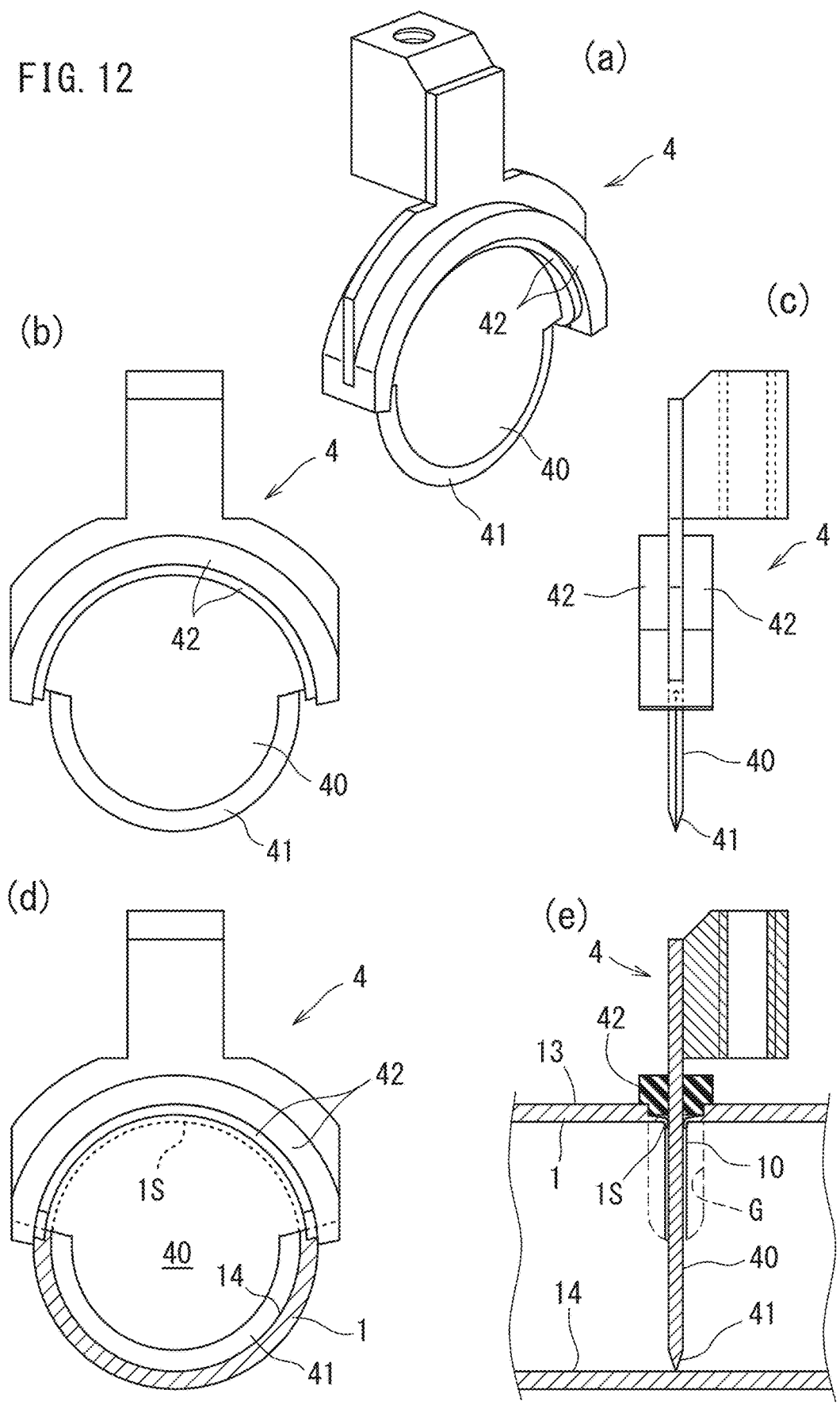

FIG. 12 is a schematic perspective view, a front view, a side view, a transverse sectional view and a longitudinal sectional view showing the structure of a gate valve according to Embodiment 1.

FIG. 13(a) is a perspective view showing a blade and a gate valve according to a variation of Embodiment 1, and FIGS. 13(b) to 13(e) are views showing the structure of the gate valve according to this variation.

FIG. 14A and FIG. 14B are a longitudinal sectional view and a transverse sectional view, respectively, showing a cutting tool and a cutter according to Embodiment 2.

FIG. 15A and FIG. 15B are a longitudinal sectional view and a transverse sectional view, respectively, showing a skin formation step of Embodiment 2.

Figure 16A:
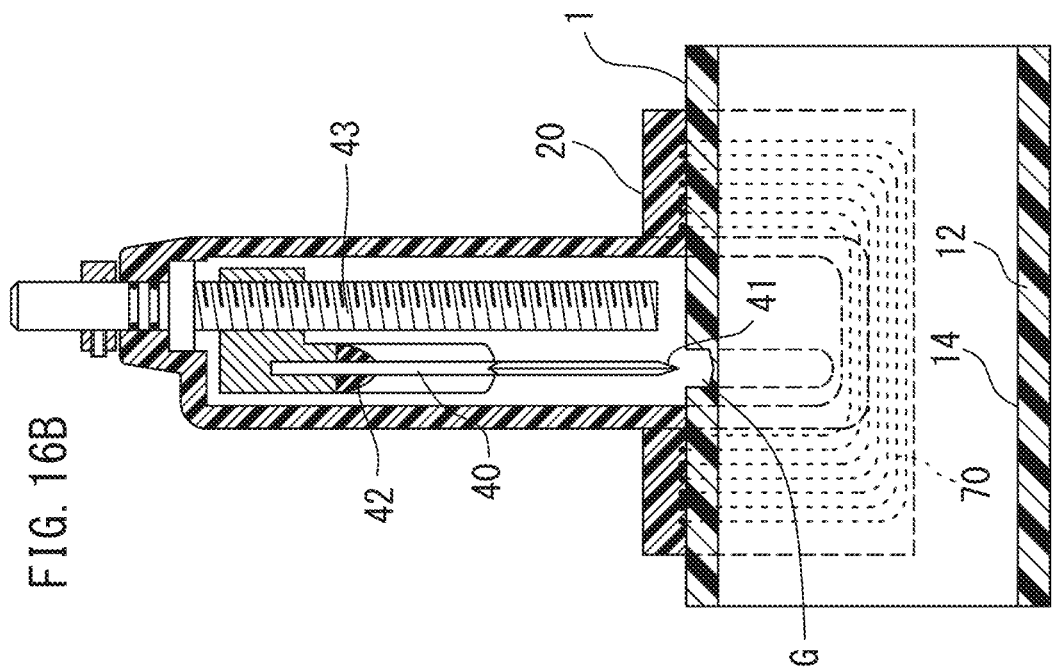
Figure 16B:
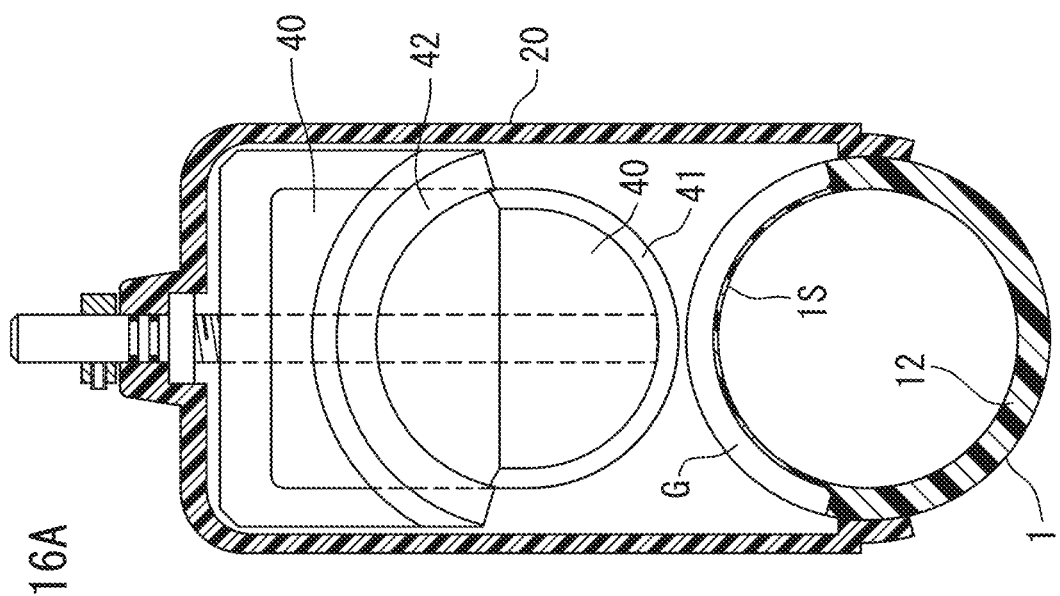

FIG. 16A and FIG. 16B are a longitudinal sectional view and a transverse sectional view, respectively, showing an assembly step of Embodiment 2.

FIG. 17A and FIG. 17B are a longitudinal sectional view and a transverse sectional view, respectively, showing an insertion step of Embodiment 2.

Figure 18A:
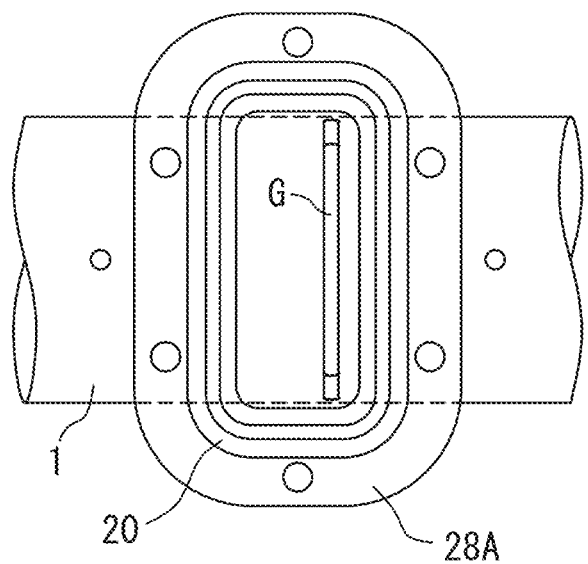
Figure 18B:
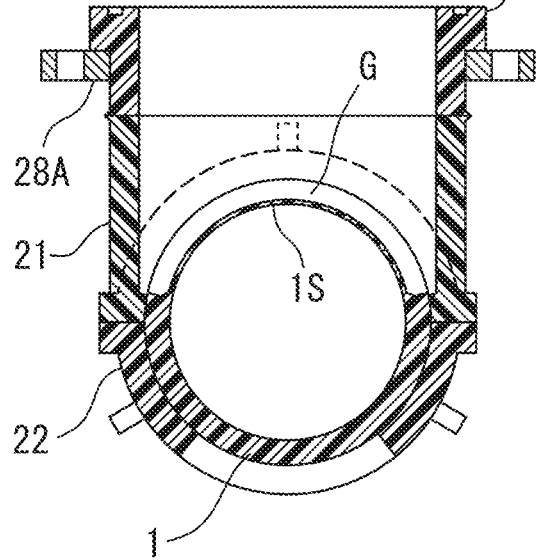
Figure 18C:
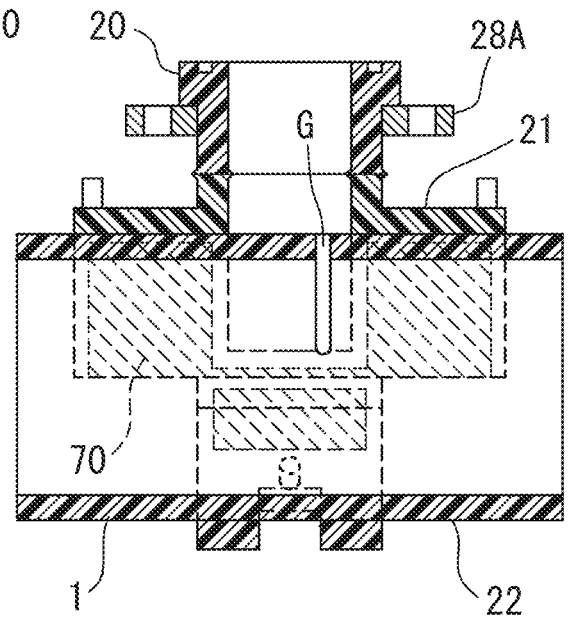

FIG. 18A, FIG. 18B and FIG. 18C are a plan view, a front view and a side view, respectively, of a case according to Embodiment 3.

Figure 19:
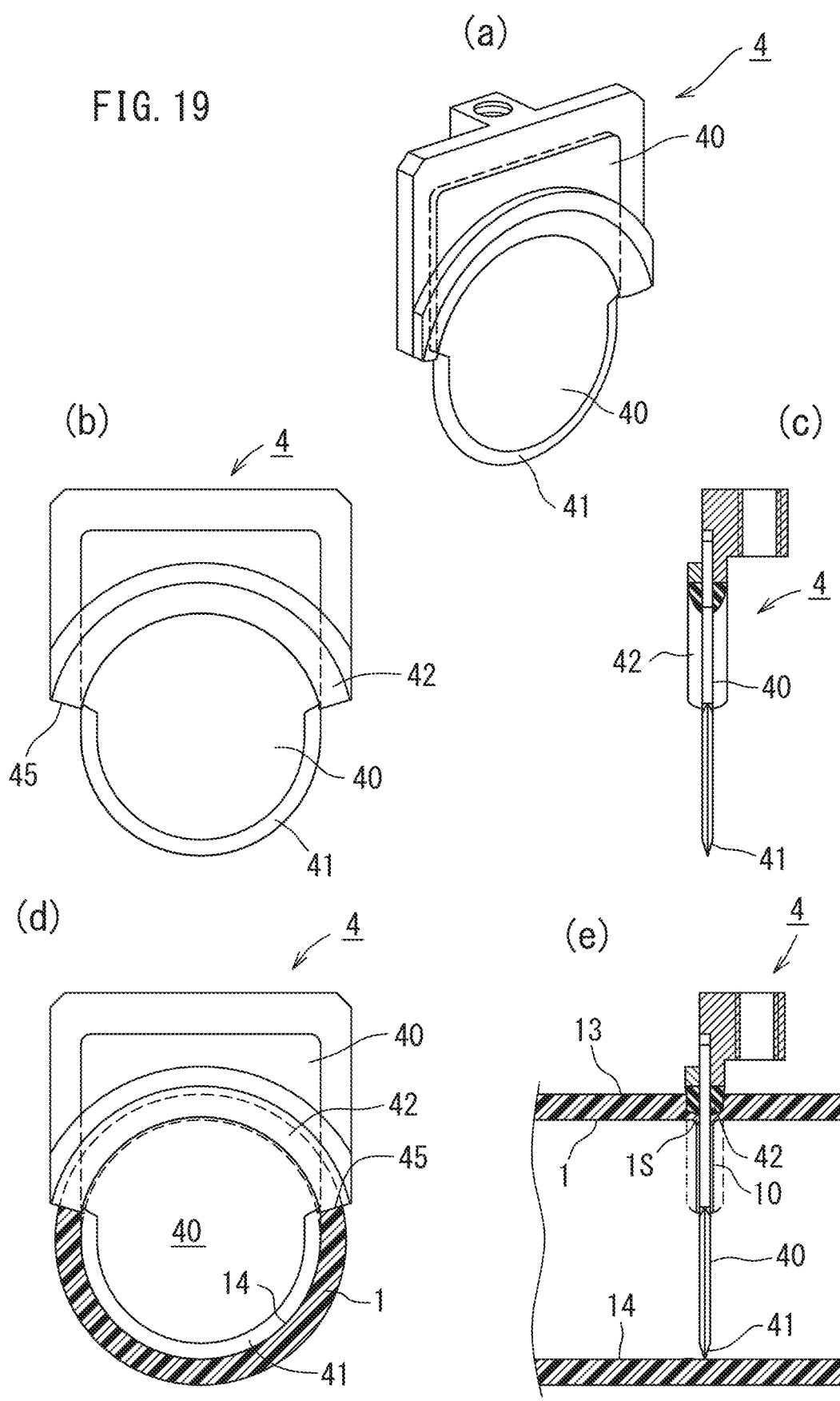

FIG. 19 is a schematic perspective view, a front view, a side view, a transverse sectional view and a longitudinal sectional view showing the structure of a gate valve according to Embodiments 2 and 3.

Figure 20:
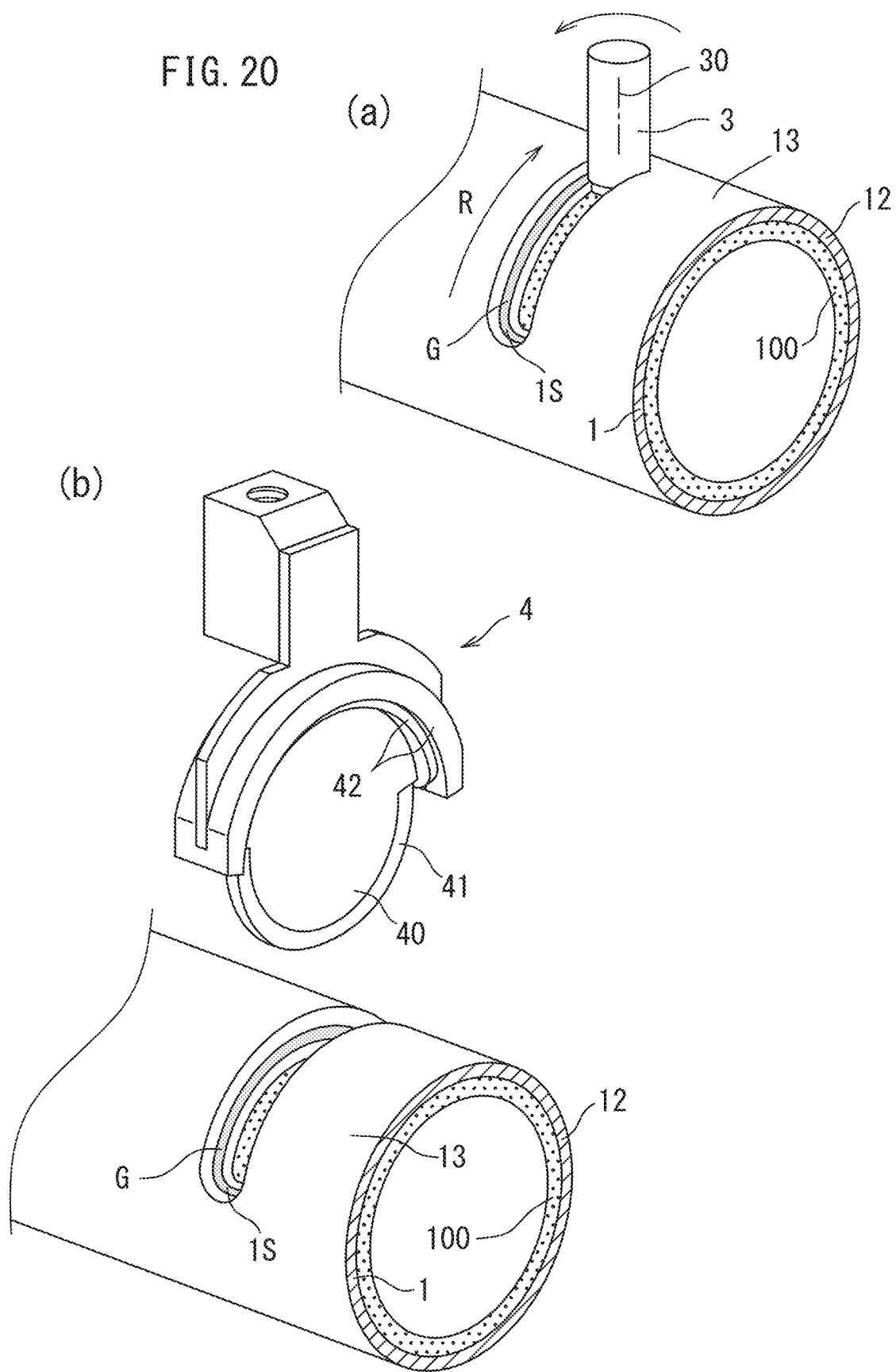

FIG. 20 is a schematic perspective view showing a step of a flow-undisrupted process according to Embodiment 4.

FIG. 21 is a schematic perspective view showing the step of the flow-undisrupted process according to Embodiment 4.

Figure 22:
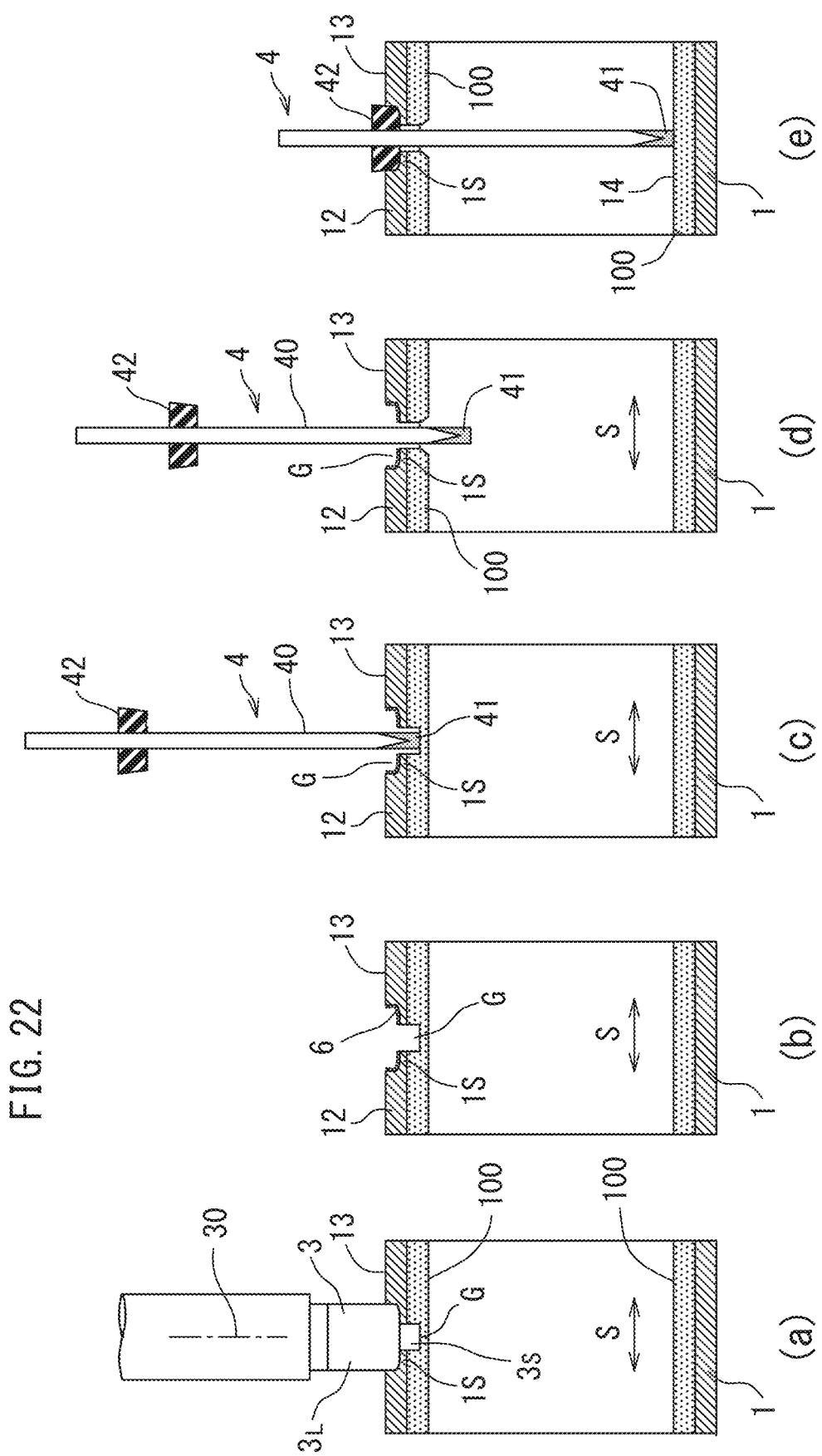

Note that a skin portion of an iron pipe is shown in gray and a mortar lining portion is dotted in FIG. 21 and FIG. 22 in order to make the structure clear.

FIG. 22 is a longitudinal sectional view showing, on an enlarged scale, a step according to Embodiment 4, together with an existing pipe.

FIG. 23(a) is a perspective view showing a blade according to Embodiment 5, and FIGS. 23(b) to 23(d) are transverse sectional views showing a process according to Embodiment 7.

FIG. 24 is a perspective view of an existing pipe showing a step of a flow-undisrupted process according to Embodiment 6.

Figure 25A:
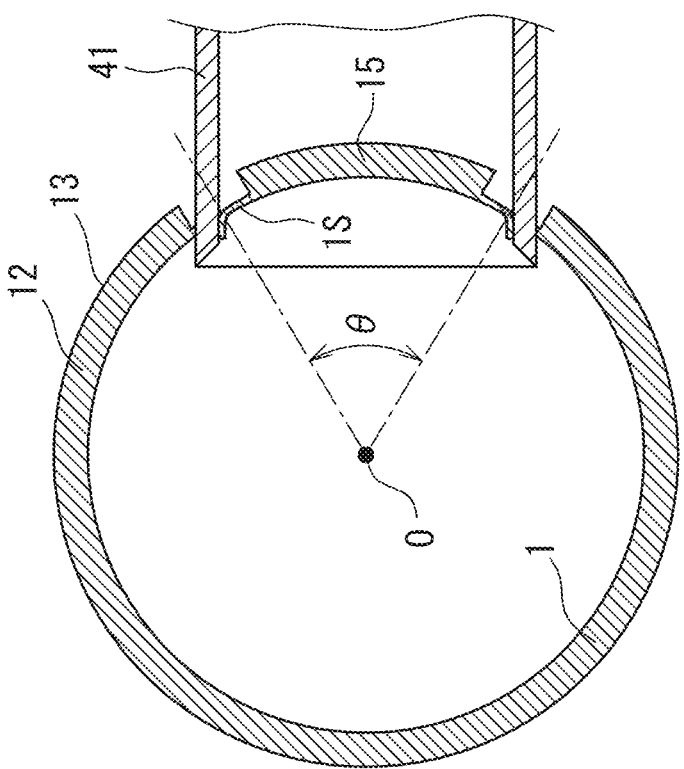
Figure 25B:
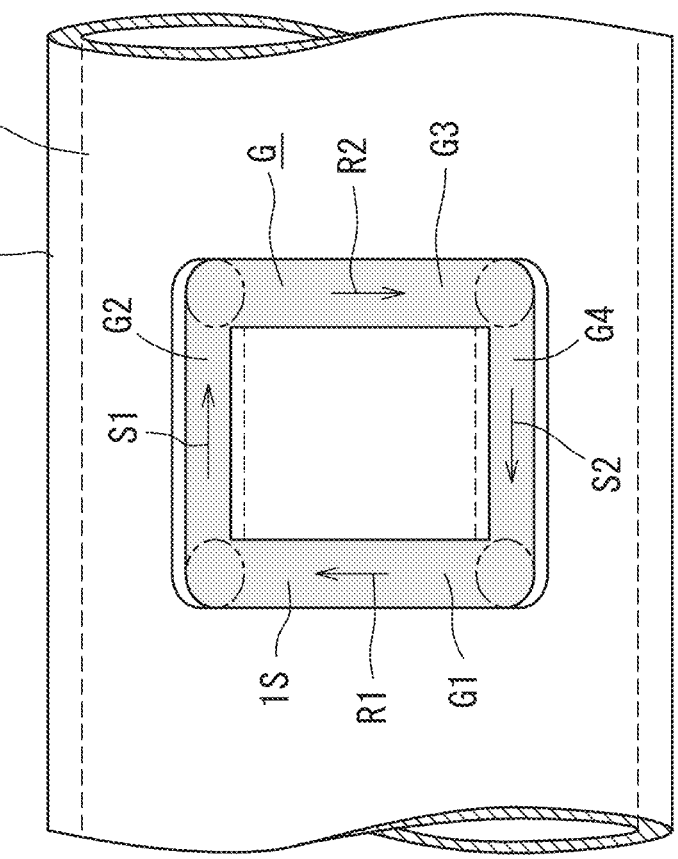

FIG. 25A and FIG. 25B are a transverse sectional view and a side view, respectively, of the existing pipe.

FIG. 26(a) is a perspective view showing a blade according to Embodiment 6, and FIGS. 26(b) to 26(d) are transverse sectional views showing a process according to Embodiment 6.

Figure 27:
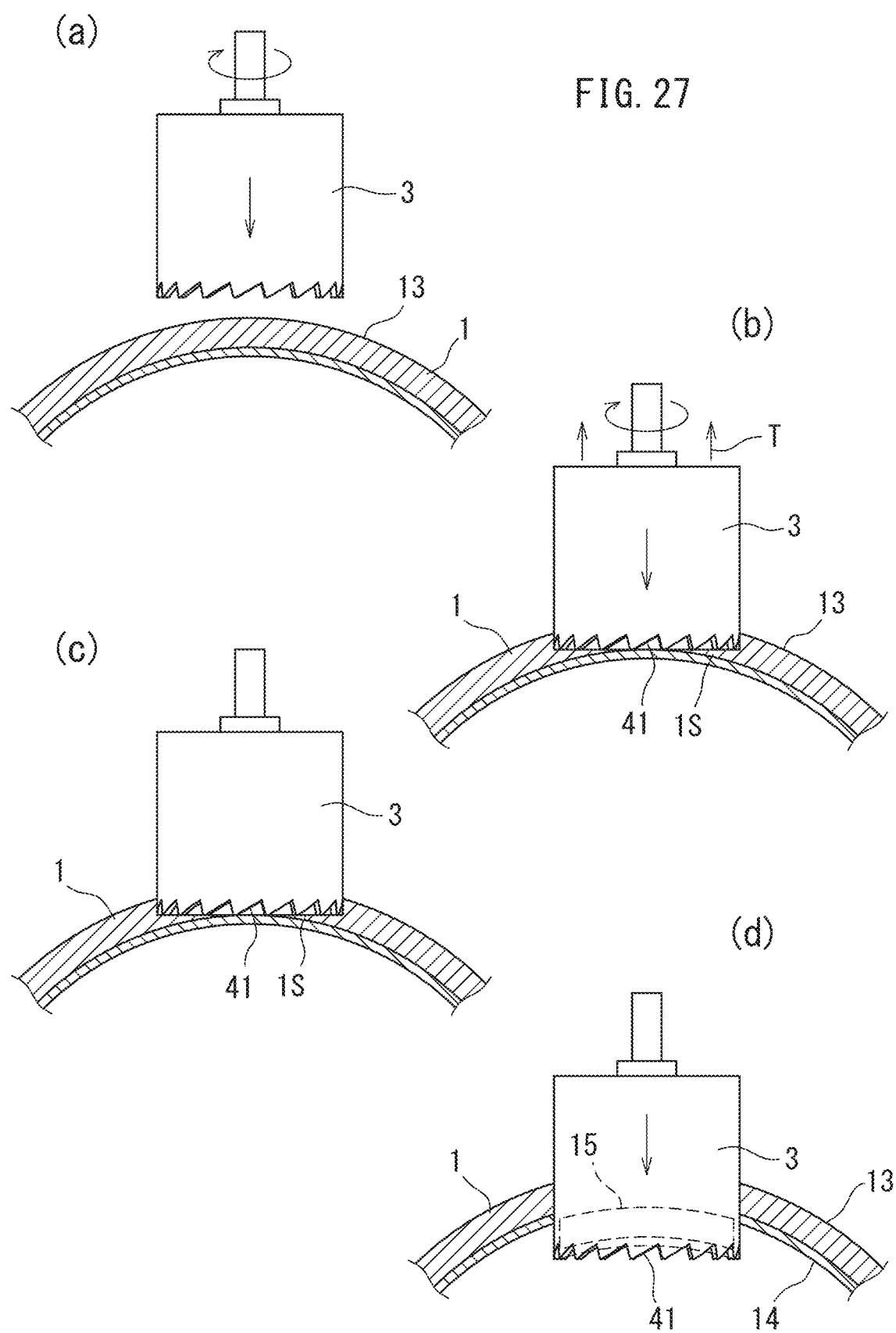

FIG. 27 is a cross-sectional view showing a step of a flow-undisrupted process according to Embodiment 7.

DESCRIPTION OF EMBODIMENTS

In a preferred process, in the enclosing step, the cutter 32 having a milling-shaped tool as the cutting tool 3 is attached to the case 20.

In this case, with the milling-shaped cutting tool 3, it is possible to form the bottomed groove with a high precision.

In a preferred process, the cutting tool 3 is revolved in a circumferential direction R of the pipe 1 together with the case 20 while rotating the milling-shaped cutting tool 3 about a central axis 30 of the tool, thereby forming the groove G having the bottom, the groove (the bottomed groove) G being elongated in the circumferential direction R.

By revolving the cutting tool 3 together with the case 20, the milling-shaped cutting tool 3 can form the bottomed groove G with a high precision. Therefore, the skin 1S can be set to any thickness, and it is possible to easily break the skin 1S with the blade while sealing the fluid in the pipe 1.

In a preferred process, the process further includes an insertion step of inserting a gate valve body 4 into the pipe 1 through the opening 10. In this case, the gate valve body 4 can be inserted into the pipe 1.

In a preferred process, the process further includes a step of forming a coating 6 on a surface of the groove G on the pipe 1 after performing the skin formation step and the removal step and before the step of forming the opening 10.

By forming a coating on the surface of the pipe 1 before forming the opening, it is possible to easily perform an anticorrosive treatment.

In a more preferred process, the gate valve body 4 includes:

a circular-shaped valve main body 40 that enters an inside of the pipe 1; a blade 41 that is provided on a distal end side of the valve main body 40 for breaking the skin 1S to form the opening 10; and a seal portion 42 that is provided on a proximal end side, which is opposite to the distal end side, and contacts a portion of the pipe 1 around the opening 10 to shut the opening 10, wherein:

the blade 41 of the gate valve body 4 thrusts through the skin 1S, thus performing the step of forming the opening 10; and the valve main body 40 of the gate valve body enters the pipe 1, and the seal portion 42 contacts the portion of the pipe 1 around the opening 10 and the distal end side of the valve main body 40 contacts an inner periphery surface 14 of the pipe 1, thus performing the insertion step.

In this case, the blade 41 provided on the gate valve body 4 thrusts through the skin 1S, and the valve main body 40 of the gate valve body 4 contacts the inner periphery surface 14 of the pipe 1, thus inserting the gate valve body 4 into the pipe 1. Thus, it is possible to insert the valve without providing an operation valve.

In a more preferred process, the groove G extends in the circumferential direction R of the pipe 1;

the skin 1S is formed so that a thickness of a central portion of the skin 1S in a pipe axial direction S is thinner than opposite side portions of the skin 1S in the pipe axial direction S; and the blade 41 breaks the thin central portion, thereby performing the step of forming the opening 10.

The skin 1S whose central portion is thinner than the opposite end portions thereof can easily be formed by using an endmill with a pointed tip or a stepped endmill.

The central portion can easily break by pressing the blade 41 of the gate valve body 4 against the central portion, which is thinner than the opposite end portions, thus enhancing the reproducibility and improving the water disruption reliability.

In a preferred piping structure, the blade 41 of the valve main body 40 is made of metal; and with the valve main body 40 in a valve-closed state, the metal-made blade 41 contacts an inner periphery surface 14 of the pipe 1, and the seal portion 42 contacts a portion of the pipe 1 around the groove G.

When the pipe 1 is a steel pipe, for example, after thrusting through the skin 1S and entering the pipe 1, the metal-made blade 41 will contact the inner periphery surface 14 of the pipe 1, thereby sealing between the upstream side and the downstream side in the pipe 1.

On the other hand, the seal portion 42 will contact a portion of the pipe 1 around the groove G, thereby sealing the vicinity thereof.

In a preferred pipe construction method, the method includes:

a step of attaching a rotating unit 2 around the pipe 1, the rotating unit 2 being rotatable in the circumferential direction. R of the pipe 1, wherein a cutter 32 having a milling-shaped cutting tool 3 is attached to the rotating unit;

a skin formation step of revolving the cutting tool 3 in a circumferential direction R of the pipe 1 together with the rotating unit while rotating the milling-shaped cutting tool 3 about a central axis 30 of the tool, thereby cutting an outer surface 13 of the pipe 1 to form the groove G on the pipe 1, the groove G being elongated in the circumferential direction R and having the bottom that is formed as the skin 1S;

a removal step of removing shavings T produced from the cutting;

a step of removing the rotating unit and the cutter 32 from the pipe 1; and a step of attaching the case 20 accommodating the gate valve body 4 therein to the pipe 1 so that the case 20 encloses the portion of the pipe 1 including the groove G having the bottom.

In this case, by using a rotating unit other than the case 20, it is possible to employ a structure capable of smoothly rotating around the pipe 1.

The rotating unit may include a plurality of rollers that are in rolling contact with the surface of the pipe.

After the formation of the groove G, the rotating unit and the cutter are removed, and a case different from the rotating unit is attached to the pipe 1. The case to be attached may be divided in the circumferential direction of the pipe, or may be of a neck flange type that surrounds the groove G. The case may be welded to the pipe 1.

Any feature illustrated and/or depicted in conjunction with one of the aspects described above or the following embodiments may be used in the same or similar form in one or more of alternative aspects or alternative embodiments, and/or may be used in combination with, or in place of, any feature of the alternative aspects or embodiments.

EMBODIMENTS

The present invention will be understood more clearly from the following description of preferred embodiments taken in conjunction with the accompanying drawings. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments of the present invention will now be described with reference to the drawings.

First, a general configuration of the present apparatus will be described.

Flow-Undisrupted Apparatus 2:

The present apparatus 2 shown in FIG. 1A to FIG. 5B is for enclosing an existing pipe 1 while a fluid (e.g., water, etc.) is flowing through the existing pipe 1, and for insertion of a valve body, etc., without disrupting the flow, as shown in FIG. 9 to FIG. 11.

Separate Cases 21 and 22:

As shown in FIG. 1A and FIG. 1B, the present apparatus 2 includes a sealing case (an example of the rotating unit) 20. The sealing case 20 includes two separate cases 21 and 22 enclosing a portion of the existing pipe 1.

The first and second separate cases 21 and 22 are separated from each other along a virtual plane that is generally orthogonal to a branch pipe portion 27. The pair of separate cases 21 and 22 are attached on the outside of the existing pipe 1 in the radial direction of the existing pipe 1 and are assembled together by fastening coupling portions 25 thereof to each other with assembly bolts/nuts 26. Note that at the coupling portions 25, the separate cases 21 and 22 are preferably in metal touch contact with each other.

As shown in FIG. 1A, the separate cases 21 and 22 each have an inner periphery surface 24 which is curved generally along an outer surface 13 of the existing pipe 1. The branch pipe portion 27 having a branch-shaped branch hole 23 protruding in the radial direction of the existing pipe 1 is formed integral with the first separate case 21 of the plurality of separate cases 21 and 22 shown in FIG. 1A.

Figure 5B:
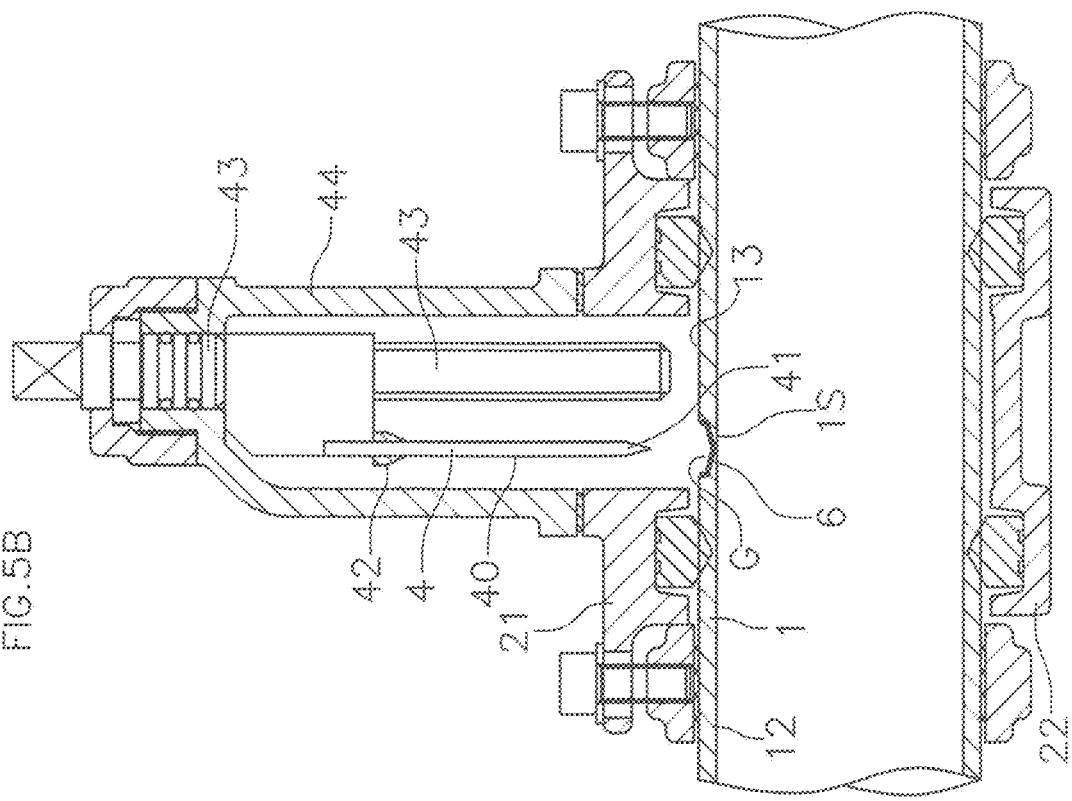
FIG. 5A and FIG. 5B are a transverse sectional view and a longitudinal sectional view, respectively, showing an assembly step of the flow-undisrupted process according to Embodiment 1.

Branch Pipe Portion 27:

A flange 28, e.g., a plate-shaped flange, is formed integral with the branch pipe portion 27, and the cutter 32 shown in FIG. 1A, a valve cover 44 shown in FIG. 5B, etc., are attached to the flange 28.

Rubber Packing 60:

In FIG. 1A and FIG. 1B, a rubber packing 60 is hatched.

As shown in FIG. 1A and FIG. 1B, a packing attachment portion 61 provided as a groove is formed on the inner surface of the separate case 21 (22). The rubber packing 60 shown in FIG. 1B is attached to the packing attachment portion 61, and the gap between the existing pipe 1 and the sealing case 20 is sealed by the rubber packing 60 as shown in FIG. 1A and FIG. 1B.

A cutting base 31 is fastened to the flange 28 of the separate case 21. The cutter 32 is attached to the cutting base 31. An endmill-like cutting tool 3 is attached at the tip of the cutter 32.

The cutter 32 rotates the cutting tool 3 about a central axis (line) 30. The cutting tool 3 is advanced/retracted in the radial direction of the existing pipe 1 by a feeder 33.

Figure 3B:
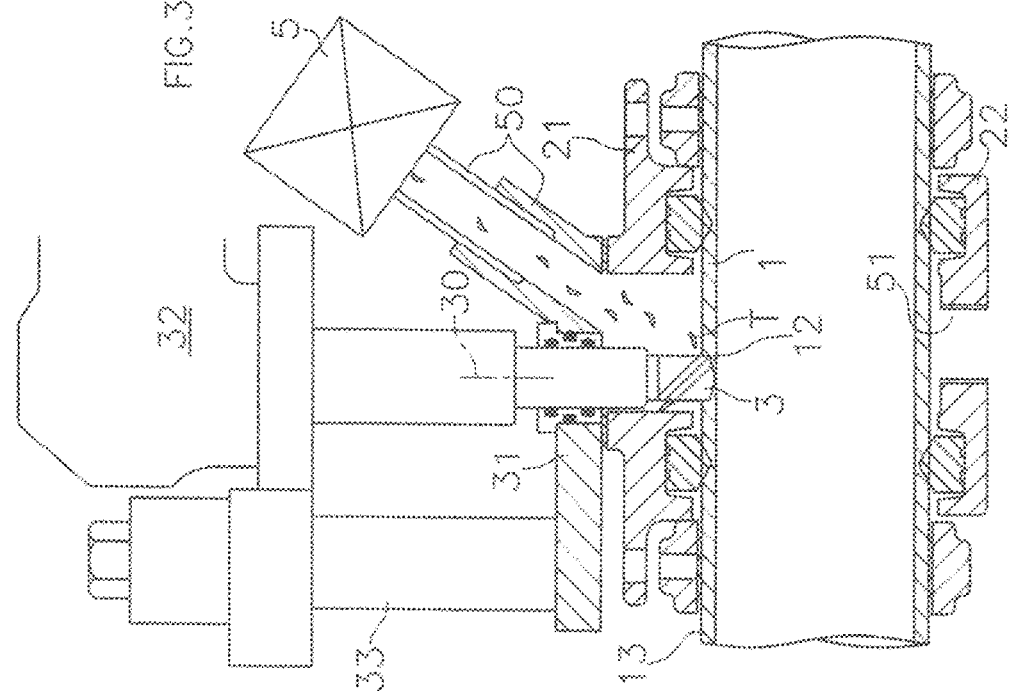
FIG. 3A and FIG. 3B are a transverse sectional view and a longitudinal sectional view, respectively, showing the skin formation step of the flow-undisrupted process according to Embodiment 1.
Figure 3A:
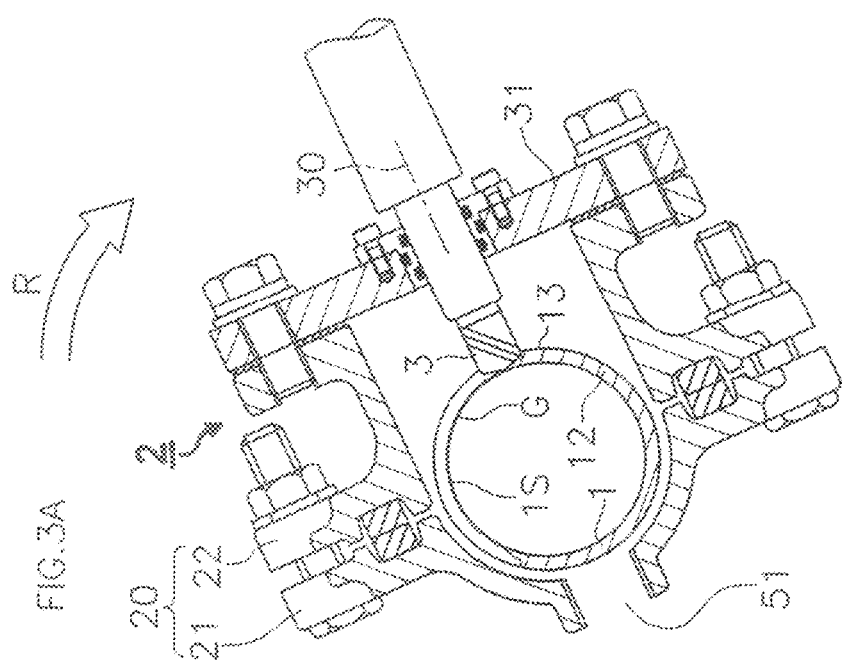

On the other hand, as shown in FIG. 2A and FIG. 3A, the cutting tool 3 and the cutter 32 can be rotated, together with the case 20, in the circumferential direction R of the existing pipe 1. Therefore, as shown in FIG. 3A, the cutting tool 3 can cut a groove G that is elongated in the circumferential direction R of the existing pipe 1.

In the present example, as shown in gray in FIG. 10, the pipe is cut so that the groove G has a bottom portion, which is a skin 1S. As shown on an enlarged scale in FIG. 9(*a*), the tip of the cutting tool 3 may be pointed in a conical shape. The angle of the tip may preferably be about 170° to 150°.

In FIG. 9(*a*), the skin 1S of the groove G is formed so that the central portion thereof in the pipe axial direction S is thinner than opposite side portions thereof in the pipe axial direction S. With a steel pipe, for example, the thickness of the central portion of the skin 1S is about 0.2 to 0.4 mm, and the thickness of the opposite side portions of the skin 1S may be about 0.4 to 0.6 mm. Note that the variation in the thickness of the skin 1S is exaggerated in the figures of the present example.

As shown in FIG. 3B, the space inside the case 20 may communicate with the negative pressure source 5 through the suction pipe 50. The negative pressure source 5 sucks shavings T, produced from cutting with the end mill, together with the air in the case 20, out of the case 20 through the suction pipe 50.

FIG. 5A to FIG. 8B show a piping structure.

As shown in FIG. 10, the present piping structure is a piping structure including a gate valve body 4 assembled into the existing pipe 1. The existing pipe 1 has the groove G. The groove G has a bottom that extends in the circumferential direction R and is formed as the skin 1S. The groove G can be formed by the endmill-like cutting tool 3. Note that a portion of the existing pipe 1 including the groove G is enclosed by the case 20 of FIG. 5A.

Figure 5A:
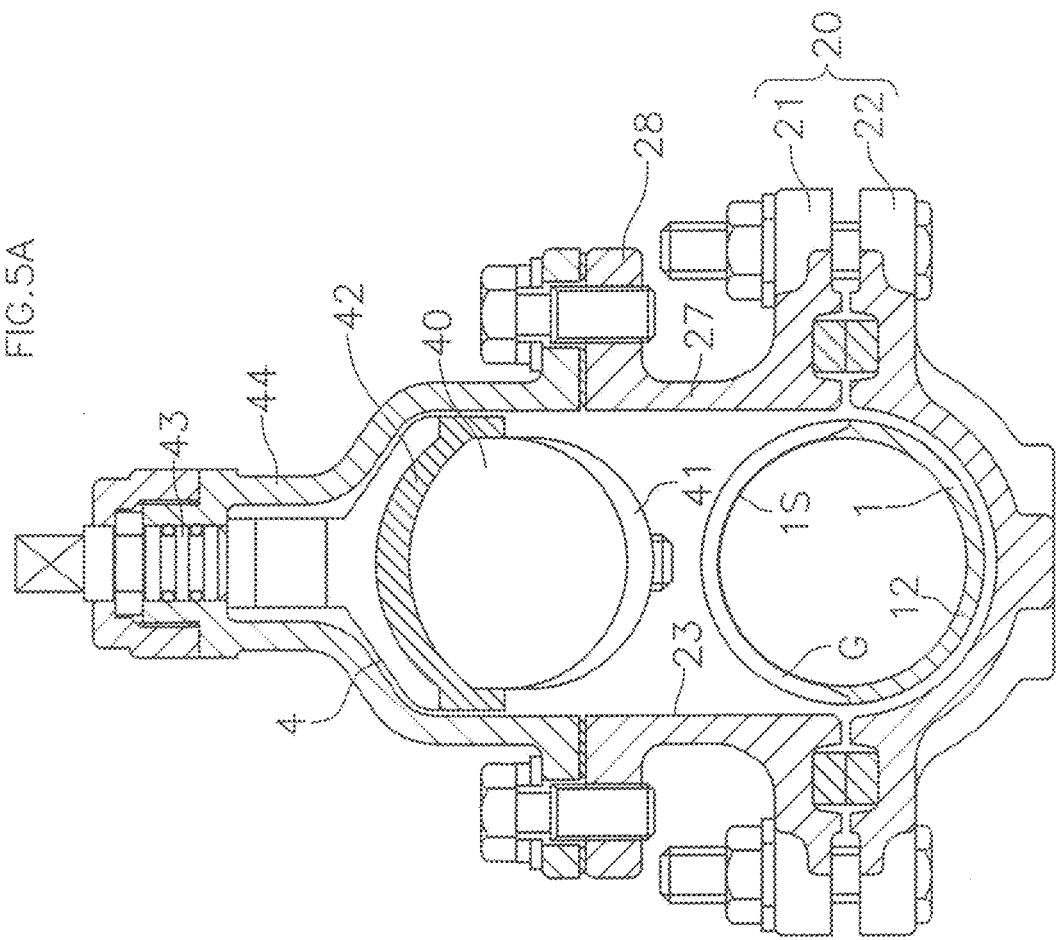

The present piping structure of FIG. 5A includes the existing pipe 1, the case 20, the gate valve body 4 and a valve rod 43. The case 20 of the present piping structure includes a valve cover 44 in addition to the first and second separate cases 21 and 22.

In the valve-open state shown in FIG. 5A, the valve cover 44 accommodates a portion of the gate valve body 4. That is, the valve cover 44 is a portion of the case 20, and the valve cover 44, the first separate case 21 and the second separate case 22 accommodate the gate valve body 4. Note that the valve cover 44 is coupled to the first separate case 21 with the flange 28 therebetween.

The valve rod 43, when rotated, brings the gate valve body 4 closer toward the groove G and further moves the gate valve body 4 in the pipe radial direction D so as to thrust through the skin 1S of the groove G to form an opening 10 of FIG. 7B.

The gate valve body 4 includes a valve main body 40, a blade 41 and a seal portion 42.

The valve main body 40 of FIG. 10 is a circular portion that enters the inside of the existing pipe 1. The blade 41 is made of metal and is provided on the distal end side of the valve main body 40 for breaking the skin 1S to form the opening 10.

Figure 8A:
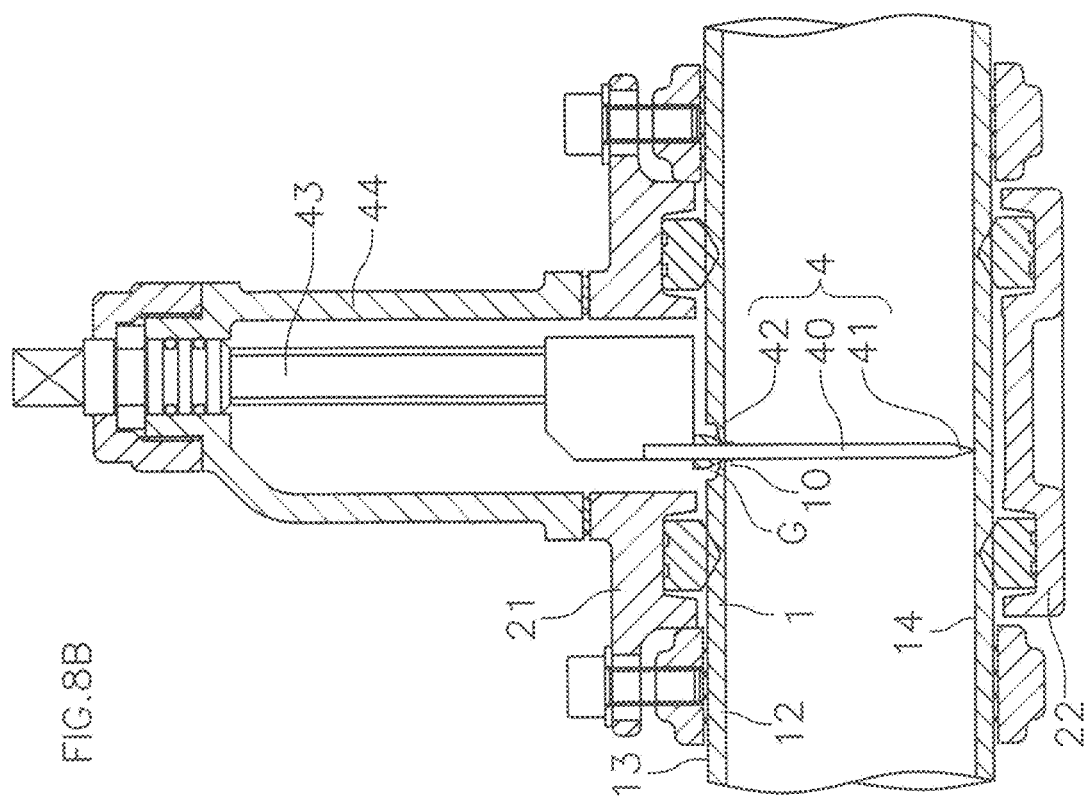
FIG. 8A and FIG. 8B are a transverse sectional view and a longitudinal sectional view, respectively, showing an insertion step of the flow-undisrupted process according to Embodiment 1.
Figure 8B:
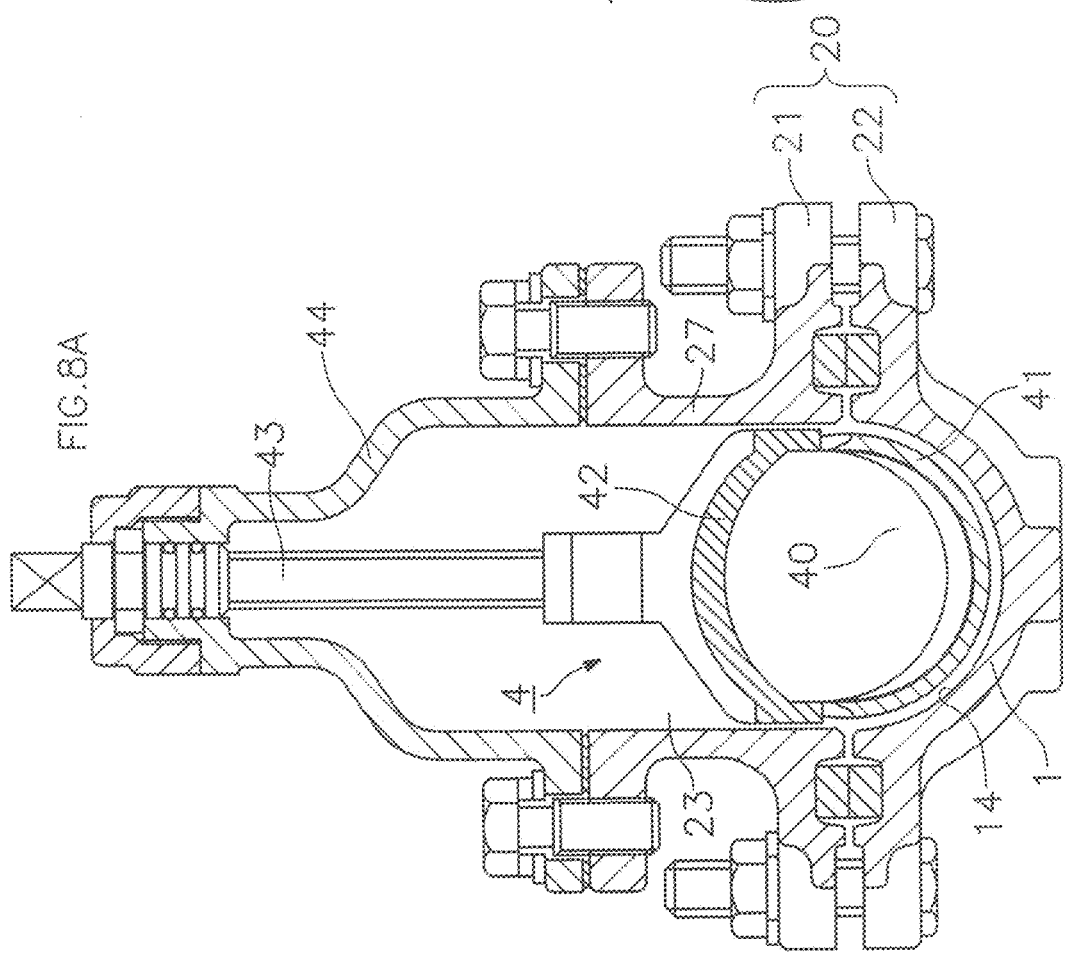

The seal portion 42 of FIG. 8B is made of rubber, provided on the proximal end side, opposite to the distal end side, and contacts a portion of the existing pipe 1 around the groove G to shut the opening 10.

With the gate valve body 4 in the valve-closed state, the metal-made blade 41 contacts the inner periphery surface 14 of the existing pipe 1, and the rubber-made seal portion 42 contacts a portion of the existing pipe 1 around the groove G.

A sealing rubber may be arranged on the upper end portion of the valve main body 40, i.e., on the seal portion 42, which contacts the groove G. These sealing rubbers may be formed integral with a metal plate by baking so as to surround the valve main body 40, Flow-Undisrupted Process:

Next, a flow-undisrupted process of forming the opening 10 in the existing pipe 1 and inserting the gate valve body 4 into the existing pipe 1 while a fluid is flowing through the existing pipe 1 will be described.

Assembly Step:

First, as shown in FIG. 1A and FIG. 1B, a portion of the existing pipe 1 is airtightly enclosed by the sealing case 20, and the cutter 32 is attached to the first separate case 21 via the flange 28 and the cutting base 31.

Note that the coupling portions 25 of the separate cases 21 and 22 are fastened by the bolts/nuts 26 in advance, thereby airtightly enclosing a portion of the existing pipe 1 with the sealing case 20.

Skin Formation Step:

Then, as shown in FIG. 2A, the cutter 32, together with the case 20, is set at a predetermined angle, and then the cutting tool 3 is moved toward the center of the existing pipe 1, thereby shaving a portion of a pipe wall 12 of the existing pipe 1 with the cutting tool 3. While in this state, i.e., while shaving the pipe 1 with the cutting tool 3, the present apparatus 2 of FIG. 3A as a whole is rotated in the circumferential direction R, thereby forming the bottomed groove G over generally half the circumference, wherein the bottomed groove G is obtained by cutting a portion of the existing pipe 1, as shown in FIGS. 10(*a*) and 10(*b*).

That is, in the skin formation step of FIG. 2A to FIG. 3B, the outer surface 13 of the existing pipe 1 is cut with the cutting tool 3 arranged inside the case 20 to form, on the existing pipe 1, the groove G having, as its bottom, the skin 1S which is the inner surface of the existing pipe 1.

In the present example, first, the cutting tool 3 is fed toward the center of the existing pipe 1 so that the cutting tool 3 does not penetrate through the existing pipe 1 while the cutting tool 3 is rotated about the central axis 30, as shown in FIG. 2A. Then, the cutting tool 3 is revolved, together with the case 20, in the circumferential direction R of the existing pipe 1, while rotating the milling-shaped cutting tool 3 of FIG. 3A about the central axis 30 of the tool, thereby forming the bottomed groove G over generally half the circumference in the circumferential direction R, for example, which is elongated in the circumferential direction R, thus performing the skin formation step.

Note that in the skin formation step, the depth to which cutting is done by the cutting tool 3 needs to be smaller than the thickness of the existing pipe 1 so that the groove G has a bottom.

Suction Step: (Removal Step)

In the suction step, as shown in FIG. 2B and FIG. 3B, the negative pressure source 5 sucks shavings T produced from cutting, together with the gas (air) in the case 20, through the suction pipe 50 in order to remove the shavings T. Note that an air introduction hole 51 may be provided in the case 20 so that it is easier to suck the shavings T together with the air during the suction of the shavings T.

Figure 4B:
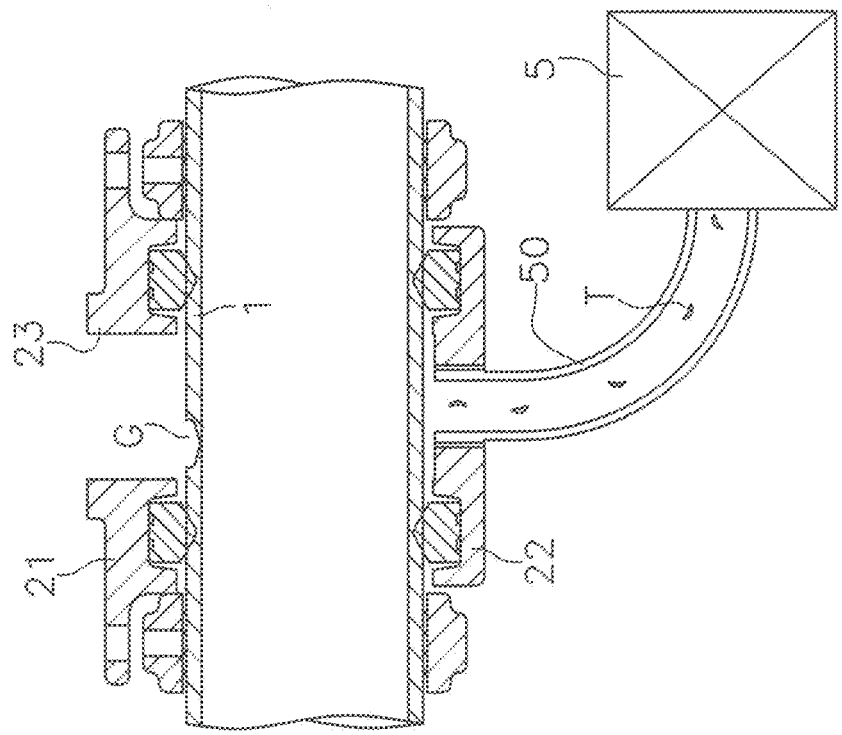
FIG. 4A and FIG. 4B are a transverse sectional view and a longitudinal sectional view, respectively, showing another method for collecting shavings.
Figure 4A:
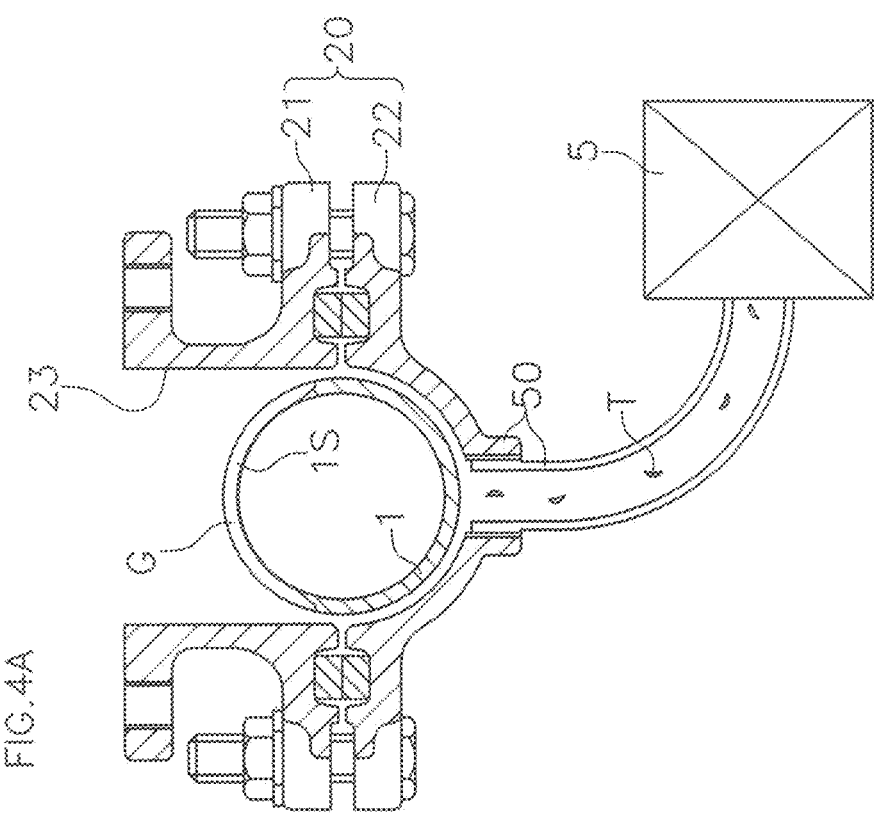

The suction step may be performed simultaneously with the skin formation step as shown in FIG. 2B and FIG. 3B, or may be performed after the skin formation as shown in FIG. 4A and FIG. 4B. A commercially-available vacuum cleaner may be used as the negative pressure source 5, in which case there is no need to secure the suction pipe 50 to the case 20.

Replacement Step:

Next, after the skin formation step of FIG. 3A and FIG. 3B, the cutter 32 and the cutting tool 3 are removed from the sealing case 20. Herein, the skin 1S keeps the fluid in the existing pipe 1. Thus, water flowing through the pipeline of the existing pipe 1 will not gush out of the existing pipe 1.

After the removal of the cutter 32 of FIG. 3B and before the formation of the opening, a coating 6 is formed on the surface of the groove G of the existing pipe 1 as shown in FIG. 9(*b*). The coating 6 may be a rubber coating as well as an anticorrosive epoxy resin, wherein a rubber coating, which is obtained by applying a liquid rubber, serves also as a sealing. The method of application may be brushing or spraying. Moreover, the application may be done while rotating the case 20. Then, as shown in FIG. 5A, the valve cover 44 is attached to the flange 28 of the first separate case 21. The gate valve body 4, which can enter the existing pipe 1, is accommodated in the valve cover 44.

Opening Formation Step:

After the replacement step, the skin formation step and the suction step are performed, the opening formation step of breaking the skin 1S to form the opening 10 is performed as shown in FIG. 6A to FIG. 8B. In the present example, the blade 41 of the gate valve body 4 thrusts through the skin 1S to form the opening 10, and the valve main body 40 further reams the opening 10.

In the present example of FIG. 10, the groove G extends in the circumferential direction R of the existing pipe 1 (see FIG. 10(*b*)), and the skin 1S is formed so that the thickness of a central portion 19 thereof in the pipe axial direction S is thinner than the opposite side portions thereof in the pipe axial direction S, as shown in FIG. 9(*c*). The blade 41 breaks the thin central portion 19, thus performing the step of forming the opening 10.

In the opening formation step, as the valve rod 43 of FIG. 5A and FIG. 5B is rotated, the blade 41 of FIG. 6B and FIG. 6A first comes into contact with the tap portion of the skin 1S of the existing pipe 1 to cut open the portion. Then, the blade 41 of FIG. 7B and FIG. 7A further cuts open the skin 1S, and the blade 41 cuts open the opposite sides of the existing pipe 1 until the blade 41 contacts the inner periphery surface 14 of the existing pipe 1 as shown in FIG. 8A and FIG. 8B.

Insertion Step:

As shown in FIGS. 9(*c*) to 9(*e*), in the opening formation step, the blade 41 cuts open the skin 1S, the blade 41 pushes open and breaks the skin 1S, and the valve main body 40 enters the existing pipe 1 together with the blade 41. That is, in the present example, the insertion step of inserting the gate valve body 4 into the existing pipe 1 is performed together with the opening formation step.

Then, when the valve rod 43 of FIG. 8A and FIG. 8B is further screwed in, the blade 41, which is already in contact with the inner periphery surface 14, does not advance, and the blade 41 of FIG. 9(*e*) comes into metal touch contact with the inner periphery surface 14 of the existing pipe 1, thereby sealing the structure.

At the same time, the seal portion 42 on the proximal end side of the valve main body 40 of FIG. 9(*e*) enters the opening 10 to come into contact with the portion of the existing pipe 1 around the opening 10, thereby sealing the portion of the opening 10.

As described above, the valve main body 40 of the gate valve body enters the existing pipe 1, and the seal portion 42 contacts the portion of the existing pipe 1 around the opening 10 and the distal end side of the valve main body 40 contacts the inner periphery surface 14 of the existing pipe 1, thus performing the insertion step.

By the insertion step, the gate valve body 4 is inserted to shut the pipeline of the existing pipe 1 and disrupt water as shown in FIG. 8A and FIG. 8B. After the water disruption, work is performed on the downstream side of the existing pipe 1. Then, the operation portion of the valve rod 43 is rotated in the reverse direction, as necessary, thereby retracting the gate valve body 4 from the inside of the existing pipe 1 as shown in FIG. 5A.

FIG. 12 shows the gate valve body 4 of Embodiment 2.

In the present example, the valve main body 40 and the gate valve body 4 are formed integral with each other.

In FIG. 12, the metal plate-shaped valve main body 40 has, on the distal end side thereof, a sharp blade 41 that is formed over generally half the circumference. As shown in FIGS. 12(*d*) and 12(*e*), in the valve-closed position, the blade 41 is pressed against the inner periphery surface 14 of the existing pipe 1, thereby sealing the gap between the inner periphery surface 14 of the existing pipe 1 and the valve main body 40.

On the other hand, as shown in FIGS. 12(*a*) to 12(*c*), a rubber packing to be the seal portion 42 is secured on the two surfaces of the valve main body 40. The seal portion 42 is provided over generally half the circumference on the proximal end side of the valve main body 40 of FIG. 12(*b*). As shown in FIG. 12(*e*), the seal portion 42 contacts the groove G and the portion of the existing pipe 1 around the groove G, thereby sealing the gap between the existing pipe 1 and the valve main body 40.

Figure 13:
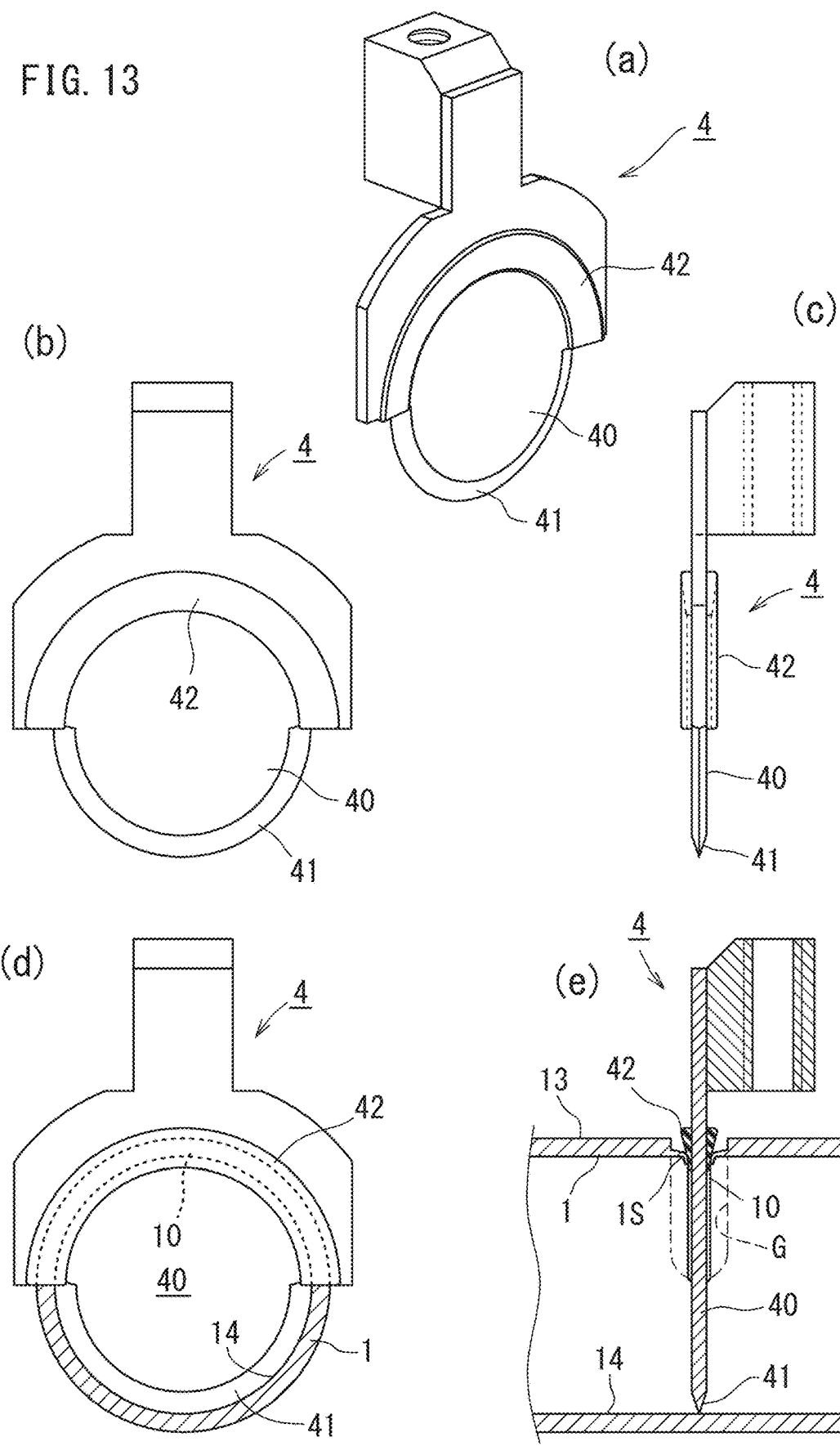

FIG. 13 shows another gate valve body 4.

The present example is a structure similar to Embodiment 2 of FIG. 12. The present example of FIG. 13 is different from Embodiment 2 of FIG. 13 in terms of structure and function of the seal portion 42.

The seal portion 42 of FIG. 13 is thin, and is configured to enter the gap between the valve main body 40 and the existing pipe 1 in the opening 10 of the existing pipe 1 as shown in FIG. 13(*e*).

That is, the seal portion 42 shown in FIG. 12(*b*) is provided as a coating on the surface of the valve main body 40 over generally half the circumference on the proximal end side of the valve main body 40. The seal portion 42 will fill small gaps produced when the blade 41 thrusts through the skin 1S. Thus, in the opening 10, the seal portion 42 seals the gap between the valve main body 40 and the skin 1S.

FIG. 14A to FIG. 15B show the cutting tool 3 and the cutter 32 according to Embodiment 2. In Embodiment 2, the rotating unit 2 different from the case 20 is used in the skin formation step, etc. It can be employed preferably also when installing a new pipe 1 to be the existing pipe 1. For example, it can be employed preferably when a new valve is installed in a continuous long polyethylene pipe.

In the present example, the rotating unit 2 includes a cutting base 2B, two roller chains 2C, four linkages 2D and four rollers 2R. The cutter 32 described above is attached to the base 2B.

As shown in FIG. 14B, the roller chains 2C and the rollers 2R are in contact with the outer circumference of the new pipe 1 to be the existing pipe 1, and the rotating unit 2 is rotatable in the circumferential direction R of the new pipe 1 or the existing pipe 1. The linkages 2D link together the roller chains 2C and the base 2B.

With the present structure, irrespective of the outer diameter of the new pipe 1 or the existing pipe 1, one type of the rotating unit 2 can accommodate many sizes.

Next, a process using the rotating unit 2 will be described.

First, as shown in FIG. 14B, the rotating unit 2 rotatable in the circumferential direction R of the new pipe 1 to be the existing pipe 1 is attached around the pipe 1. During the attachment, the cutter 32 having the milling-shaped cutting tool 3 is attached to a base 2B of the rotating unit 2.

Then, the cutting tool 3 is fed toward the center of the pipe 1 while the cutting tool 3 is rotated about the central axis 30. Thereafter, while the milling-shaped cutting tool 3 of FIG. 15B is rotated about the central axis 30 of the tool, the cutting tool 3 is revolved, together with the rotating unit 2, in the circumferential direction R of the pipe 1, thereby cutting the outer surface 13 of the pipe 1, and forming the groove G on the pipe 1, the groove G being elongated in the circumferential direction R and having a bottom that is formed as the skin 1S, thus performing the skin formation step.

The rotating unit 2 and the cutter 32 are removed from the new pipe 1, and the surface of the pipe 1 is wiped with a cloth, or the like, to remove the shavings T produced from cutting. After the rotating unit 2 of FIG. 15B is removed, the case 20, the valve cover 44 and the gate valve body 4 are instead assembled to the new pipe 1 as in FIG. 5A and FIG. 5B. Thus, the case 20 accommodating the gate valve body 4 therein is attached to the pipe 1 so as to enclose the new pipe 1 including the groove G.

After performing the attachment step, the step of thrusting through the skin 1S to form the opening 10 is performed as necessary. That is, when it becomes necessary to disrupt water, the gate valve body 4 is pushed toward the existing pipe 1 to form the opening 10 and insert the gate valve body 4 into the existing pipe 1 as in FIG. 6A to FIGS. 9(c) to 9(e).

FIG. 16A to FIG. 17B shows another case 20 according to Embodiment 2.

In these figures, the case 20 is made of polyethylene, and is welded to the pipe 1 made of polyethylene. In this example, the case 20 covers generally half the circumference of the pipe 1 including the groove G. Note that the case 20 includes a heating wire 70 for heating embedded therein, as well known in the art.

FIG. 18A to FIG. 18C show a case 20 according to Embodiment 3.

Also in this example, as in Embodiment 2 described above, the case 20 is made of polyethylene and includes the heating wire 70 embedded therein.

Note that in the present example, the case 20 covers the entire circumference of the pipe 1. A metal-made flange 28A connected to the valve cover is provided.

FIG. 19 shows the gate valve body 4 according to Embodiments 2 and 3.

In the present example, the pipe 1, which is the subject of the construction, is a pipe made of a plastomer or an elastomer such as a polyethylene (polyolefin-based resin) pipe or a PVC (polyvinyl chloride) pipe, etc.

In the present example, the seal portion 42 of the gate valve body 4 does not need an elastomer. That is, as shown in FIG. 19(e), when the valve main body 40 enters the existing pipe 1, the skin 1S of the existing pipe 1 contacts the valve main body 40, Since the skin 1S is a plastomer, it will seal the gap between the skin 1S and the metal-made valve main body 40.

In the present example, the water pressure in the existing pipe 1 acts upon the skin 1S. Therefore, the thickness of the skin 1S may preferably be about 3 mm to 5 mm. The angle of the tip of the cutting tool 3 may preferably be about 120° to 160°.

As shown in FIGS. 19(a) to 19(d), the blade 41 of the gate valve body 4 is preferably formed so that the gate valve body 4 cuts into the existing pipe 1 not only along the circumferential portion that contacts the inner periphery surface 14 of the existing pipe 1 but also at opposite end portions 45 that contact the existing pipe 1 at the opposite ends of the opening 10 of the existing pipe 1.

Note that in the example of FIG. 19 described above, after the cutting with the cutting tool, the sealing case 20 assembled to the existing pipe 1 may be welded to the polyethylene-made existing pipe 1 (see, for example, JP2004-245397A).

Next, a method of valve insertion using the case 20 of Embodiment 2 will be described.

First, prior to valve insertion, the bottomed groove G is formed on the new pipe 1 to be the existing pipe 1 as shown in FIG. 14A to FIG. 15B. After the formation of the groove G, the case 20 of FIG. 16A and FIG. 16B is welded to the pipe 1.

First, the case 20 is attached to the pipe 1 so that the blade 41 of the valve main body 40 is aligned with the groove G of the pipe 1. Note that the valve main body 40 is accommodated in the case 20. Then, power is supplied to the heating wire 70 to melt the contact portion between the case 20 and the pipe 1 and the contact portion is then allowed to cool so as to weld together the case 20 and the pipe 1.

Water is allowed to flow after the welding, and the pipeline is disrupted by inserting the valve main body 40 into the pipe 1 as shown in FIG. 17A and FIG. 17B as necessary.

FIG. 20 to FIG. 22 show Embodiment 4.

In these figures, the existing pipe 1 is a cast iron pipe having an inner layer of a mortar lining 100.

In these examples, a stepped endmill is used as the cutting tool 3 of FIG. 22(a). The endmill includes a large diameter portion $3_L$ and a small diameter portion $3_S$, with particles of diamond, or the like, stuck on the outer surface.

When the existing pipe 1 is cut with the present cutting tool 3, the large diameter portion $3_L$ cuts only the cast iron portion of the surface layer of the existing pipe 1 while the small diameter portion $3_S$ cuts the mortar lining 100 of the existing pipe 1. The groove G of the existing pipe 1 obtained by cutting includes a shallow and wide portion and a deep and narrow portion as shown in FIG. 20.

Note that after cutting, a coating may be applied on the cut surface of cast iron, thereby forming the coating 6, as shown in FIG. 22(b).

After the formation of the stepped groove G described above, the blade 41 of the valve main body 40 is pressed against the portion where the inner layer of the mortar lining 100 is exposed as shown in FIG. 21 and FIGS. 22(c) to 22(e). Since the mortar lining 100 is fragile, the mortar lining 100 is cracked by the blade 41, allowing the valve main body 40 to enter the existing pipe 1.

In the present example, a rubber lining is preferably provided on the portion of the blade 41 of the valve main body 40. Thus, it is possible to seal even a mortar-lined pipe.

As shown in FIG. 22(e) and FIG. 21(a), it is preferred that a sealing rubber packing is secured to the seal portion 42.

Figure 23:
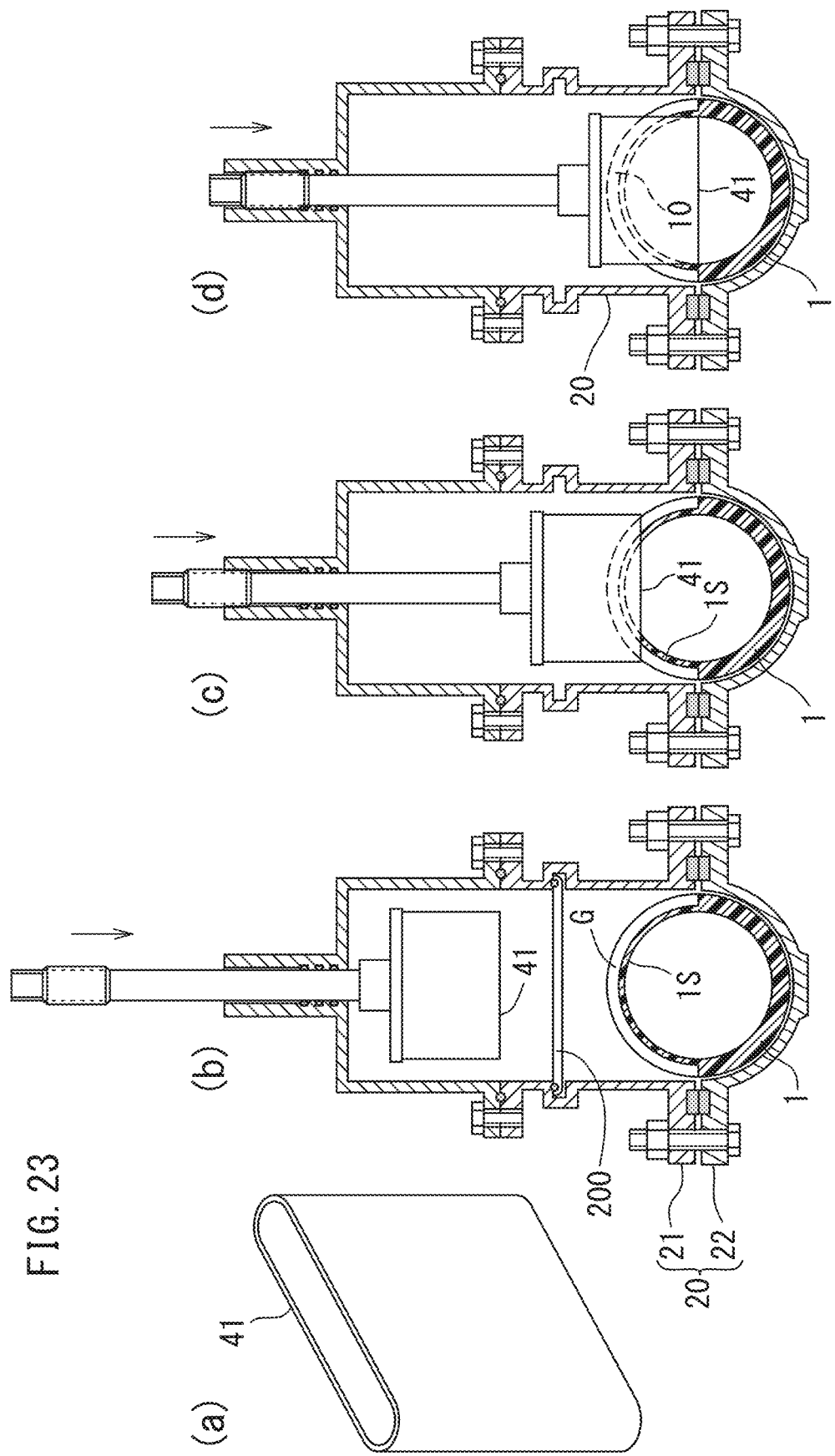

FIG. 23 shows Embodiment 5. The present example is preferably applicable when the existing pipe 1 is a plastomer.

In this example, a Thomson-type blade 41 cuts through the skin 1S. In this case, it is possible to increase the thickness of the gate valve body to be inserted. Therefore, it may be applicable also to large-sized existing pipes.

In this case, after the formation of the opening 10, a gate valve body and a valve cover, instead of the blade 41, are attached to the case 20, and the gate valve body is assembled into the existing pipe 1. Therefore, an operation valve 200 becomes necessary for the case 20 as well known in the art.

Note that in the present example, it is preferred that the skin 1S has a constant uniform thickness.

FIG. 24 to FIG. 27 show Embodiments 6 and 7.

These examples are used when a branch pipe is taken out of the existing pipe 1 rather than inserting the gate valve body 4 into the existing pipe 1.

Figure 26:
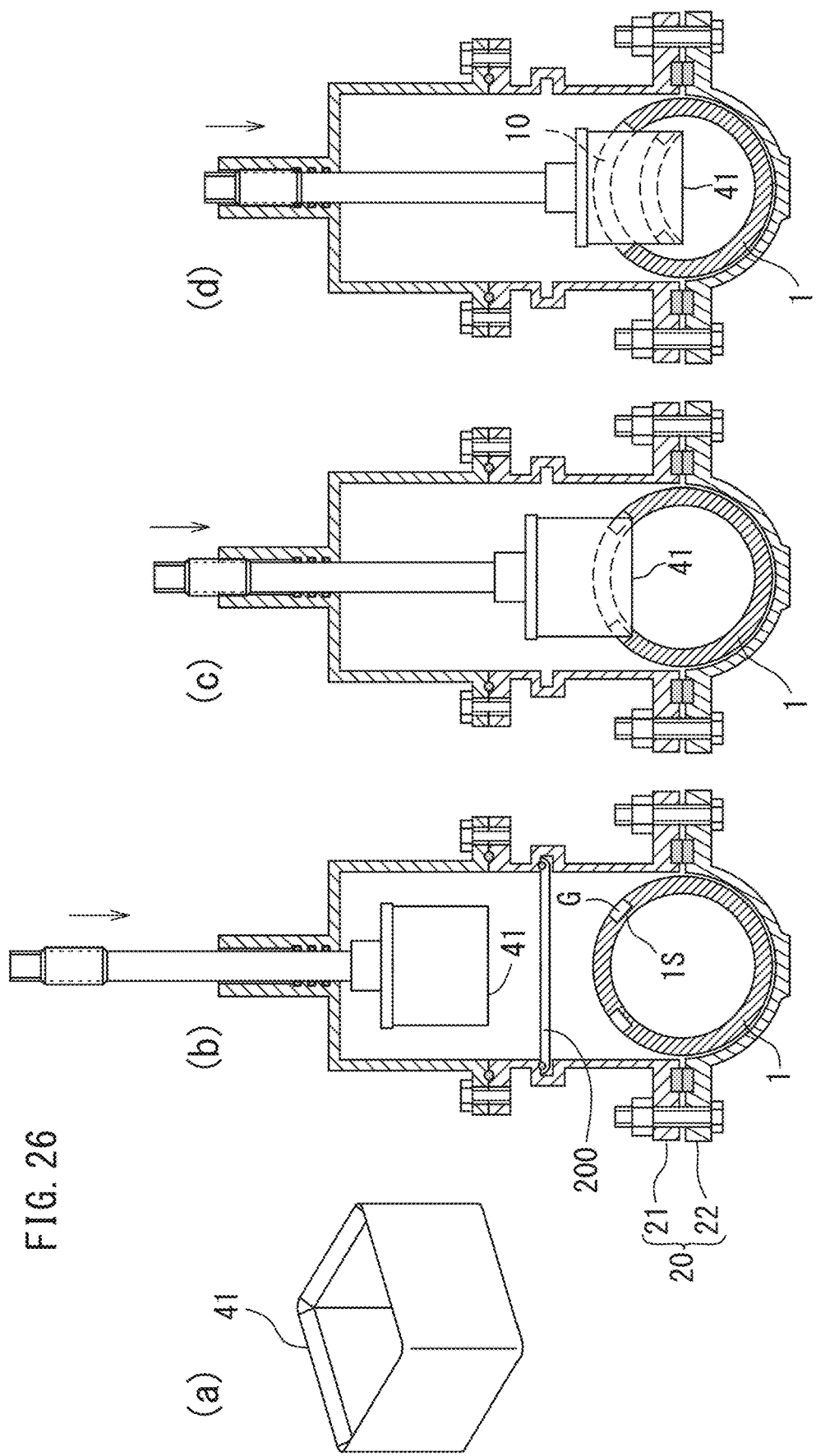

FIG. 24 to FIG. 26 show Embodiment 6.

In the process shown in FIG. 24, the cutting tool 3 is revolved in the circumferential direction R of the existing pipe 1, together with the case 20 (see FIG. 1A) and moved in the pipe axial direction S of the existing pipe 1 while rotating the milling-shaped cutting tool 3 about the central axis 30 of the tool (see FIG. 1A), thereby forming the bottomed groove G in a loop shape, thus performing the skin formation step.

More specifically, the cutting tool 3 is revolved over an angle θ (FIG. 25A) in the first circumferential direction R1 of FIG. 24(a), together with the case, thereby forming the first groove G1. Then, the cutting tool 3 is slightly moved in the first axial direction S1 of FIG. 24(b) together with the case, thereby forming the second groove G2. Then, the cutting tool 3 is revolved over the angle θ in the second circumferential direction R, opposite to the first circumferential direction R1, together with the case, thereby forming the third groove G3. Finally, the cutting tool 3 is slightly moved in the second axial direction S2, opposite to the first axial direction S1, together with the case, thereby forming the fourth groove G4.

Thus, there is formed a square loop-shaped bottomed groove G as shown in FIG. 24(d) and FIG. 25B. Note that the center angle θ shown in FIG. 25A may be about 60° to 90°. A method disclosed in Japanese Patent No. 4422242 may be employed as the method for moving the cutting tool 3 in the axial direction S together with the case.

In this process, as shown in FIGS. 26(b) to 26(d), in the step of forming the opening 10, the loop blade 41, which coincides with the loop-shaped bottomed groove G, is used to thrust through the skin 1S, thereby forming the opening 10 to be the branch port in the existing pipe 1.

That is, a square tube-shaped Thomson-type blade 41 of FIG. 26(a) cuts through the skin 1S of FIG. 25A. In this case, it is preferred that a barb is provided on the inner side of the blade 41 so that a cut piece 15 can be collected with the blade 41.

After the cutting through, the blade 41 of FIG. 26(d) is removed from the case 20 by opening/closing a valve 200 of FIG. 26(b). After the removal, a branch pipe is connected to the case 20 with the valve 200 closed.

Note that the cutting tool 3 may be revolved in the circumferential direction R and moved in the pipe axial direction S at the same time to form a circular loop-shaped bottomed groove.

In Embodiment 7 of FIG. 27, the cutting tool 3 is a hole saw. A barb for collecting the cut piece 15 may be provided on the inner surface of the hole saw.

In the present example, as shown in FIGS. 27(a) and 27(b), the hole saw 3 is rotated to cut through the outer surface 13 of the existing pipe 1. In this process, the shavings T are sucked out, together with the air, through the back surface of the hole saw 3.

When the hole saw 3 cuts the existing pipe 1 and the skin 1S is formed on the existing pipe 1 as shown in FIG. 27(b), the rotation of the hole saw 3 is stopped as shown in FIG. 27(c). After the stopping, when the hole saw 3 is pushed in the pipe radial direction, i.e., toward the center of the existing pipe 1, the hole saw 3 thrusts through the skin 1S, and the cut piece 15 fits into the hole saw 3 as shown in FIG. 27(d).

Note that after the removal of the hole saw 3, a branch pipe is connected.

While preferred embodiments have been described above with reference to the drawings, various obvious changes and modifications will readily occur to those skilled in the art upon reading the present specification.

For example, the tip of the endmill does not need to be pointed, but the endmill may be used to form a groove of an even depth. The fluid to flow through the pipe may be gas as well as water or oil.

Thus, such changes and modifications are deemed to fall within the scope of the present invention, which is defined by the appended claims.

INDUSTRIAL APPLICABILITY

The flow-undisrupted process and the piping structure of the present invention can be used for inserting a gate valve body into a line of an existing pipe or a new pipe of water, gas, etc., to disrupt the flow of the fluid with the inserted gate valve body.

The flow-undisrupted process of the present invention can be employed also when installing a branch pipe after so-called flow-undisrupted boring.

REFERENCE SIGNS LIST

1: Existing pipe, 10: Opening, 12: Pipe wall, 13: Outer surface, 14: Inner periphery surface, 15: Cut piece 19: Central portion 2: Rotating unit, 2B: Base, 2C: Roller chain, 2D: Linkage, 2R: Roller 20: Case, 21: First separate case, 22: Second separate case, 23: Branch hole, 24: Inner periphery surface, 25: Coupling portion, 26: Assembly bolt/nut, 27: Branch pipe portion, 28: Flange 29: Stopper 3: Cutting tool, 30: Central axis, 31: Cutting base, 32: Cutter, 33: Feeder $3_L$: Large diameter portion, $3_S$: Small diameter portion 4: Gate valve body, 40: Valve main body, 41: Blade, 42: Seal portion, 43: Valve rod, 44: Valve cover, 45: Opposite end portions, 5: Negative pressure source, 50: Suction pipe, 51: Introduction hole 6: Coating, 70: Heating wire, 100: Mortar lining D: Pipe radial direction, G: Groove, G1 to G4: First to fourth grooves R, R1, R2: Circumferential direction, S, S1, S2: Axial direction, T: Shavings

The invention claimed is:

1. A process for forming an opening in a pipe, comprising:
a step of enclosing a portion of the pipe with a case, wherein a cutter having a milling-shaped tool as a cutting tool is attached to the case;

a skin formation step of cutting an outer surface of the pipe with the cutting tool arranged in the case, thereby forming a groove on the pipe, the groove having a bottom that is formed as a skin;

a removal step of removing shavings produced from the cutting; and a step of thrusting through the skin to form the opening, after performing the skin formation step and the removal step.

2. The process according to claim 1, wherein the skin formation step is performed by revolving the cutting tool in a circumferential direction of the pipe together with the case while rotating the milling-shaped cutting tool about a central axis of the tool, thereby forming the groove having the bottom, the groove being elongated in the circumferential direction.

3. The process according to claim 2, further comprising an insertion step of inserting a gate valve body into the pipe through the opening.

4. The process according to claim 1, further comprising a step of forming a coating on a surface of the groove on the pipe after performing the skin formation step and the removal step and before the step of forming the opening.

5. The process according to claim 1, wherein the cutting tool is revolved in a circumferential direction of the pipe and moved in a pipe axial direction of the pipe while rotating the milling-shaped cutting tool about a central axis of the tool, thereby forming the bottomed groove in a loop shape, thus performing the skin formation step.

6. The process according to claim 5, wherein:
in the step of forming the opening, a loop-shaped blade, which coincides with the loop-shaped bottomed groove, is used to thrust through the skin, thereby forming the opening to be a branch port in the pipe; and
the process further comprises a step of removing the loop-shaped blade.

7. A process for forming an opening in a pipe, comprising:
a step of attaching a rotating unit around the pipe, the rotating unit being rotatable in a circumferential direction of the pipe, wherein a cutter having a milling-shaped cutting tool is attached to the rotating unit;
a skin formation step of revolving the cutting tool in the circumferential direction of the pipe together with the rotating unit while rotating the milling-shaped cutting tool about a central axis of the tool, thereby cutting an outer surface of the pipe to form a groove on the pipe, the groove being elongated in the circumferential direction and having a bottom that is formed as a skin;
a removal step of removing shavings produced from the cutting; and
a step of thrusting through the skin to form the opening, after performing the skin formation step and the removal step.

8. The process according to claim 7, wherein:
the rotating unit includes a case that is divided in the circumferential direction of the pipe;
in the attachment step, a portion of the pipe is enclosed with the case, the process further comprising:
an assembly step of assembling, instead of the tool, a flat plate-shaped gate valve body to the case before the step of forming the opening, the gate valve body being used for thrusting through the skin; and
an insertion step of inserting the gate valve body into the pipe through the opening in the step of forming the opening.

9. The process according to claim 8, wherein the gate valve body includes:

a circular-shaped valve main body that enters an inside of the pipe; a blade that is provided on a distal end side of the valve main body for breaking the skin to form the opening; and a seal portion that is provided on a proximal end side, which is opposite to the distal end side, and contacts a portion of the pipe around the opening to shut the opening, wherein:

the blade of the gate valve body thrusts through the skin, thus performing the step of forming the opening; and the valve main body of the gate valve body enters the pipe, and the seal portion contacts the portion of the pipe around the opening and the distal end side of the valve main body contacts an inner periphery surface of the pipe, thus performing the insertion step.

10. The process according to claim 9, wherein:
the groove extends in the circumferential direction R of the pipe;
the skin is formed so that a thickness of a central portion of the skin in a pipe axial direction is thinner than opposite side portions of the skin in the pipe axial direction; and
the blade breaks the thin central portion, thereby performing the step of forming the opening.

11. The process according to claim 7, further comprising:
a step of removing the rotating unit and the cutter;
an assembly step of assembling a case to the pipe so that the case encloses the bottomed groove of the pipe, the case accommodating therein a flat plate-shaped gate valve body that thrusts through the skin, the assembly step performed prior to the step of forming the opening; and
an insertion step of inserting the gate valve body into the pipe through the opening in the step of forming the opening.

12. The process according to claim 7, further comprising a step of forming a coating on a surface of the groove on the pipe after performing the skin formation step and the removal step and before the step of forming the opening.

13. A pipe construction process for obtaining a piping structure, the piping structure including a gate valve body assembled into a pipe, the piping structure comprising:
a pipe that defines a groove extending in a circumferential direction, the groove having a bottom that is formed as a skin;
a case that encloses a portion of the pipe including the groove having the bottom;
a gate valve body that is arranged in the case; and
a valve rod that brings the gate valve body closer toward the groove and further moves the gate valve body so as to thrust through the skin of the bottom of the groove to form an opening,
wherein the gate valve body includes:
a circular-shaped valve main body that enters an inside of the pipe;
a blade that is provided on a distal end side of the valve main body for breaking the skin to form the opening; and
a seal portion that is provided on a proximal end side, which is opposite to the distal end side, and contacts a portion of the pipe around the opening to shut the opening,
the pipe construction process comprising:
a step of attaching a rotating unit around the pipe, the rotating unit being rotatable in the circumferential direction of the pipe, wherein a cutter having a milling-shaped cutting tool is attached to the rotating unit;

a skin formation step of revolving the cutting tool in a circumferential direction of the pipe together with the rotating unit while rotating the milling-shaped cutting tool about a central axis of the tool, thereby cutting an outer surface of the pipe to form the groove on the pipe, the groove being elongated in the circumferential direction and having the bottom that is formed as the skin;

a removal step of removing shavings produced from the cutting;

a step of removing the rotating unit and the cutter from the pipe; and a step of attaching the case accommodating the gate valve body therein to the pipe so that the case encloses the portion of the pipe including the groove having the bottom.

14. The pipe construction process according to claim 13, wherein:

the blade of the valve main body is made of metal; and with the valve main body in a valve-closed state, the metal-made blade contacts an inner periphery surface of the pipe, and the seal portion contacts the portion of the pipe around the opening.

* * * * *